US012366107B2

(12) United States Patent
Middleton

(10) Patent No.: US 12,366,107 B2

(45) **Date of Patent: *Jul. 22, 2025**

(54) VISION LIGHT SYSTEM FOR BARRIER SYSTEMS

(71) Applicant: AADG, INC., New Haven, CT (US)

(72) Inventor: Patrick Middleton, Medina, TN (US)

(73) Assignee: AADG, INC., New Haven, CT (US)

( * ) Notice: Subject to any disclaimer, the term of this patent is extended or adjusted under 35 U.S.C. 154(b) by 196 days.

This patent is subject to a terminal disclaimer.

(21) Appl. No.: 18/127,082

(22) Filed: Mar. 28, 2023

(65) Prior Publication Data

US 2023/0323731 A1 Oct. 12, 2023

Related U.S. Application Data

(63) Continuation-in-part of application No. 17/015,418, filed on Sep. 9, 2020, now Pat. No. 11,692,388.

(60) Provisional application No. 62/897,651, filed on Sep. 9, 2019.

(51) Int. Cl.
*E06B 3/54* (2006.01)
*E06B 3/58* (2006.01)

(52) U.S. Cl.
CPC ............ *E06B 3/5892* (2013.01); *E06B 3/549* (2013.01)

(58) Field of Classification Search
CPC .......... E06B 3/5481; E06B 3/549; E06B 3/58; E06B 3/5892; E06B 3/5878; E06B 3/5807; E06B 5/10; E06B 5/106; E06B 5/11; E06B 5/116; E06B 5/12
See application file for complete search history.

(56) References Cited

U.S. PATENT DOCUMENTS

| | | | | |
|---|---|---|---|---|
| 2,837,786 A | | 6/1958 | Fryar, Jr. | |
| 3,161,972 A | | 12/1964 | Newcomb et al. | |
| 3,969,857 A | | 7/1976 | Stark | |
| 4,259,818 A | * | 4/1981 | Stark | E06B 3/605 52/212 |
| 4,527,369 A | | 7/1985 | Adams | |
| 4,909,005 A | | 3/1990 | Adams | |

(Continued)

FOREIGN PATENT DOCUMENTS

| | | | | |
|---|---|---|---|---|
| CA | 2738253 A1 | | 7/2012 | |
| DE | 202011003233 U1 | * | 10/2011 | E06B 3/5892 |
| WO | WO-2012107259 A1 | * | 8/2012 | E06B 3/5821 |

*Primary Examiner* — Ryan D Kwiecinski

(74) *Attorney, Agent, or Firm* — Moore & Van Allen PLLC; Jeffrey R. Gray

(57) ABSTRACT

Door systems having a vision light system that provides resistance to and protection from the elements, such as but not limited to physical impacts (e.g., penetration from projectiles), protection from fire, protection from fluid penetration, or the like. The vision light systems may be customizable in order to provide different protection rating levels depending on the requirements of the structures in which vision light systems will be used. Moreover, the vision light systems may use a light insert having a first restraining member, a second restraining member, and a vision light secured between the first restraining member and the second restraining member. The light insert allows for the ease of replacement of the vision light within the vision light system when the vision light is damaged or the vision light requires upgrading or downgrading of the desired level of protection of the vision light.

18 Claims, 25 Drawing Sheets

(56) References Cited

U.S. PATENT DOCUMENTS

| | | | | |
|---|---|---|---|---|
| 5,207,044 | A * | 5/1993 | LaSee | E06B 3/5409 52/476 |
| D353,071 | S | 12/1994 | Roberts | |
| 5,749,184 | A * | 5/1998 | McKann | E06B 3/5885 49/501 |
| 5,941,032 | A * | 8/1999 | Lydon, Jr. | E06B 3/5821 52/656.2 |
| 5,987,844 | A | 11/1999 | Reid et al. | |
| D417,739 | S | 12/1999 | Smith, Jr. | |
| D418,234 | S | 12/1999 | Smith, Jr. | |
| D418,616 | S | 1/2000 | Smith, Jr. | |
| D420,454 | S | 2/2000 | Smith, Jr. | |
| 6,546,682 | B1 * | 4/2003 | DeBlock | E06B 5/12 52/204.68 |
| 6,895,718 | B2 | 5/2005 | Moffatt | |
| 7,430,836 | B2 | 10/2008 | Sibbett | |
| 7,518,811 | B2 | 4/2009 | D'Eon | |
| 7,814,716 | B2 | 10/2010 | Moffatt | |
| 7,980,032 | B2 | 7/2011 | Moffatt | |
| 8,156,699 | B2 | 4/2012 | LaSee | |
| 8,359,796 | B1 | 1/2013 | Plummer et al. | |
| 8,365,480 | B1 | 2/2013 | Plummer et al. | |
| 8,434,284 | B1 * | 5/2013 | Plummer | E06B 3/5892 52/745.16 |
| 8,495,797 | B2 | 7/2013 | La See | |
| 8,733,041 | B2 * | 5/2014 | Phipps | E06B 3/5892 52/204.591 |
| 8,839,578 | B2 * | 9/2014 | Struthers | H02G 1/00 52/205 |
| 9,022,091 | B2 * | 5/2015 | Shives | E06B 3/485 160/201 |
| 9,255,439 | B2 * | 2/2016 | Goossens | E06B 3/5892 |
| 9,487,949 | B2 | 11/2016 | Hager et al. | |
| 9,506,247 | B2 | 11/2016 | Feldpausch et al. | |
| 9,850,701 | B1 * | 12/2017 | Arway | E06B 5/10 |
| 10,329,759 | B2 | 6/2019 | Feldpausch et al. | |
| 10,337,226 | B2 | 7/2019 | Warren | |
| 2004/0226233 | A1 * | 11/2004 | LaSee | E06B 3/5892 52/204.5 |
| 2011/0239560 | A1 * | 10/2011 | Landeros | E06B 3/305 52/656.2 |
| 2012/0304585 | A1 | 12/2012 | Coatwala | |
| 2014/0331564 | A1 | 11/2014 | Wei | |
| 2018/0135349 | A1 * | 5/2018 | Arway | E06B 5/10 |

* cited by examiner

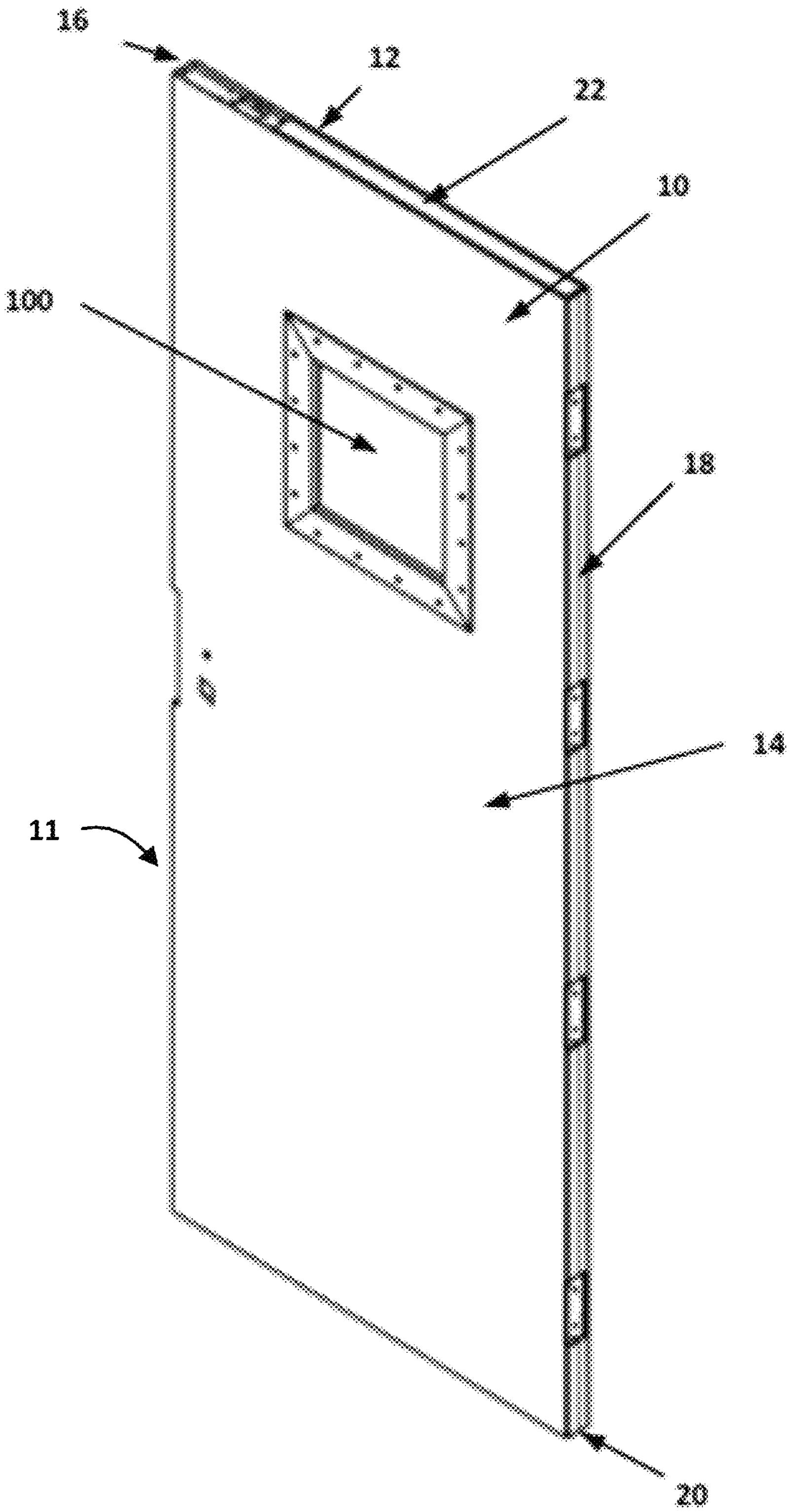
*FIG.* 1B

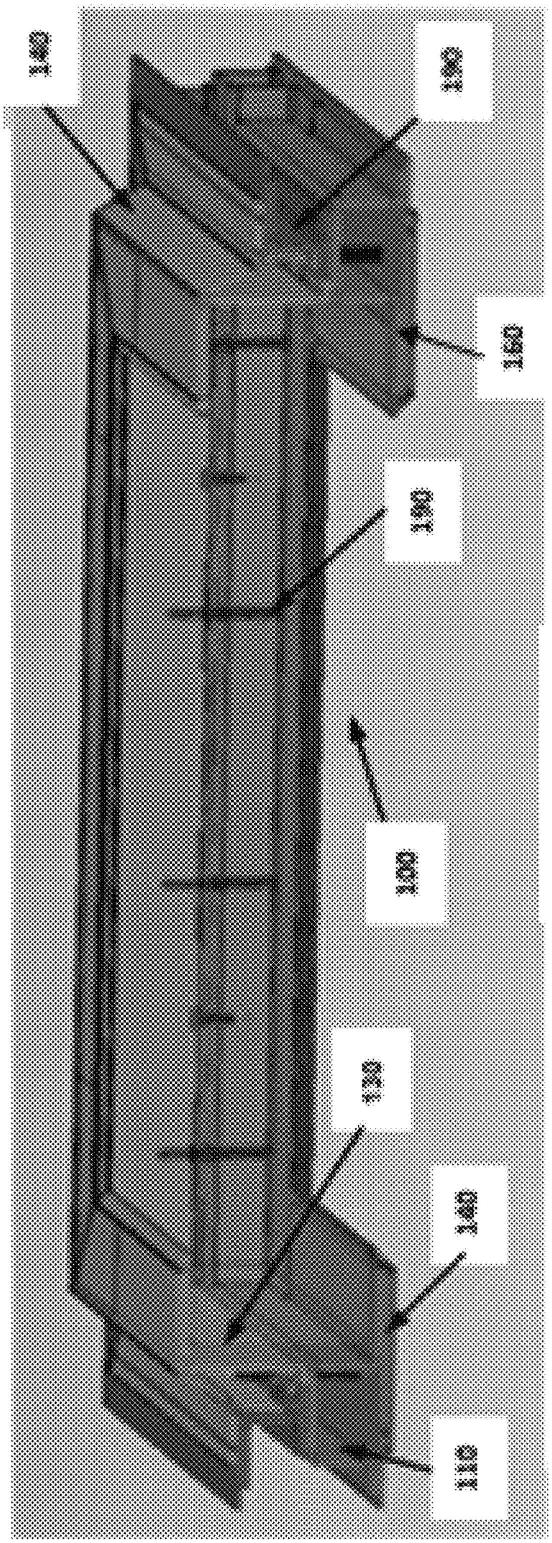
*FIG.* 6A
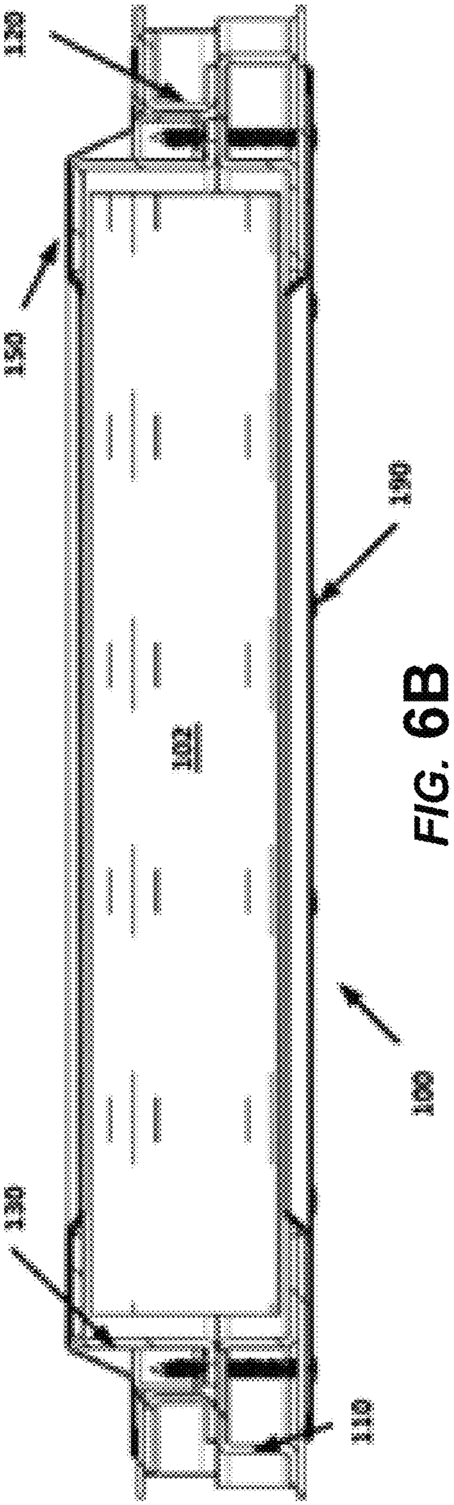
*FIG.* 6B

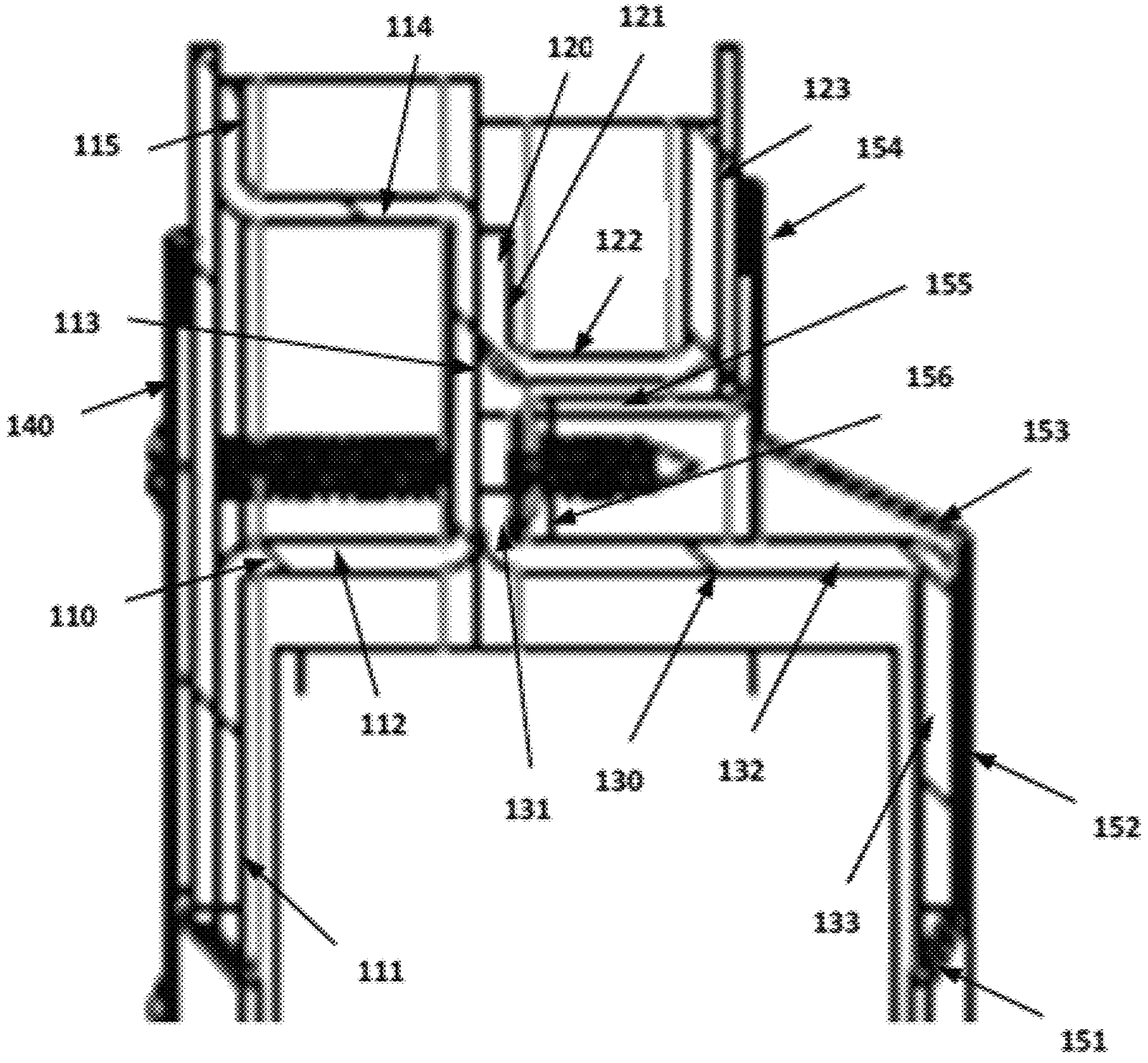
*FIG.* 7B

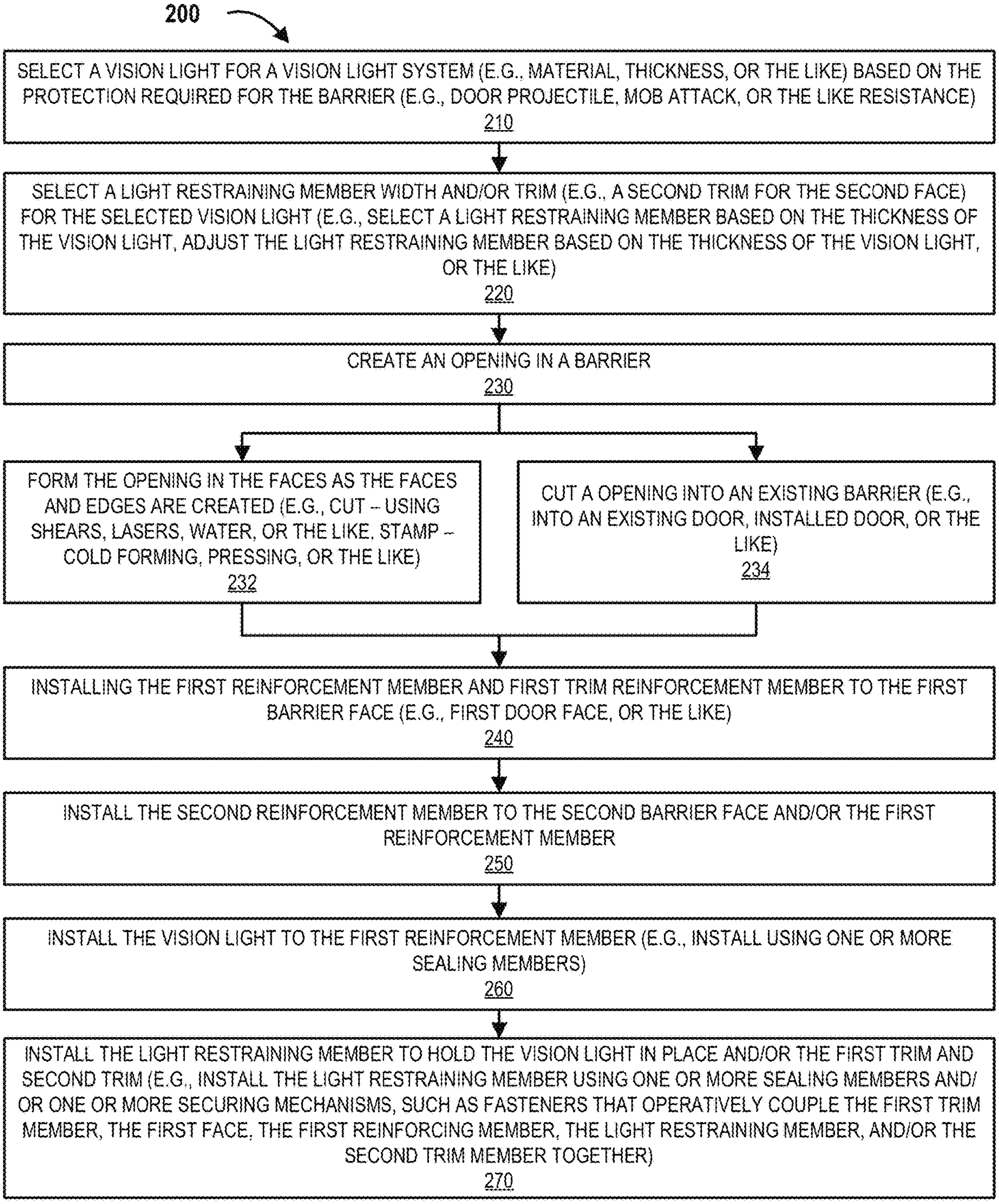
*FIG.* 8

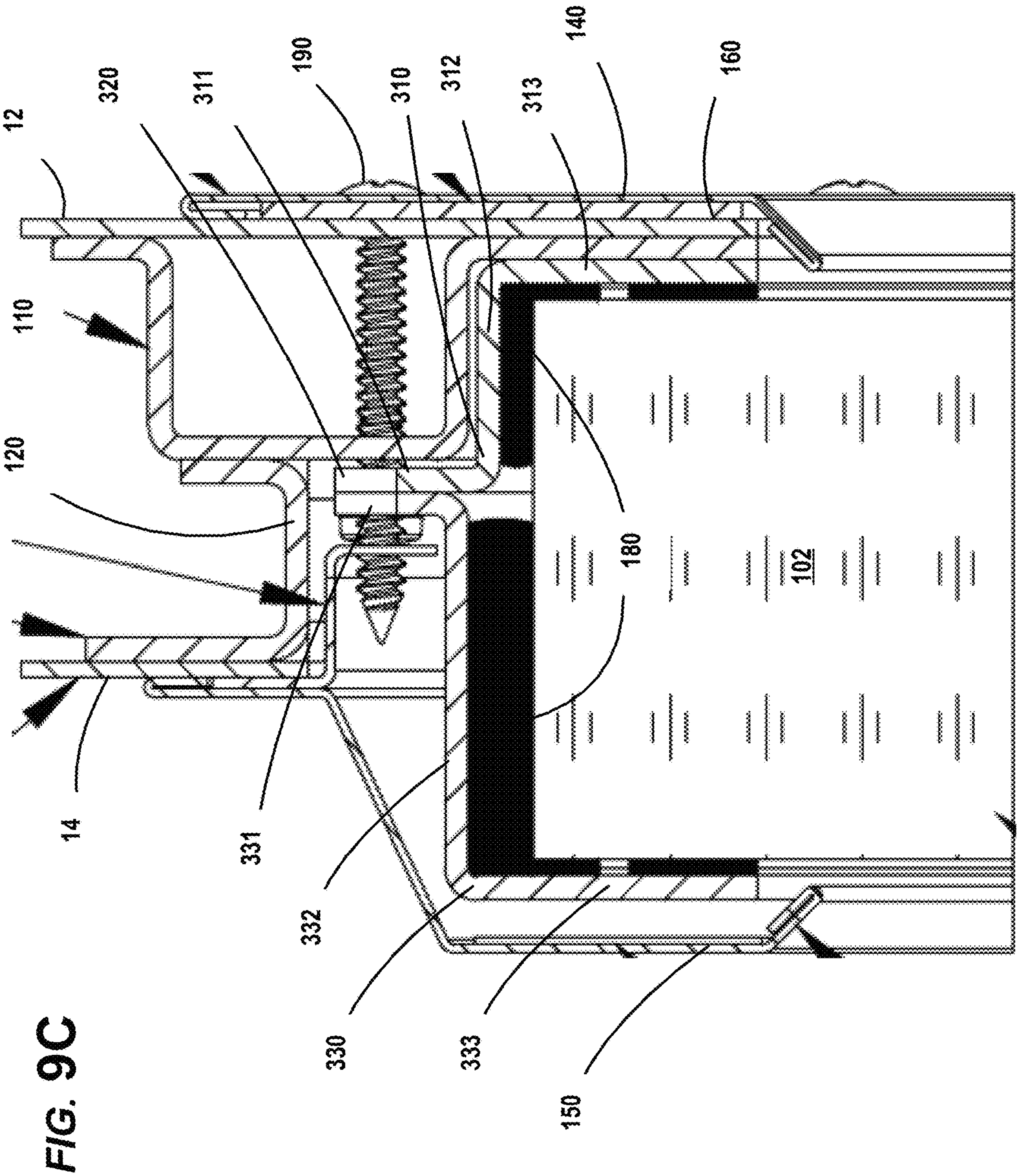
*FIG.* 9C

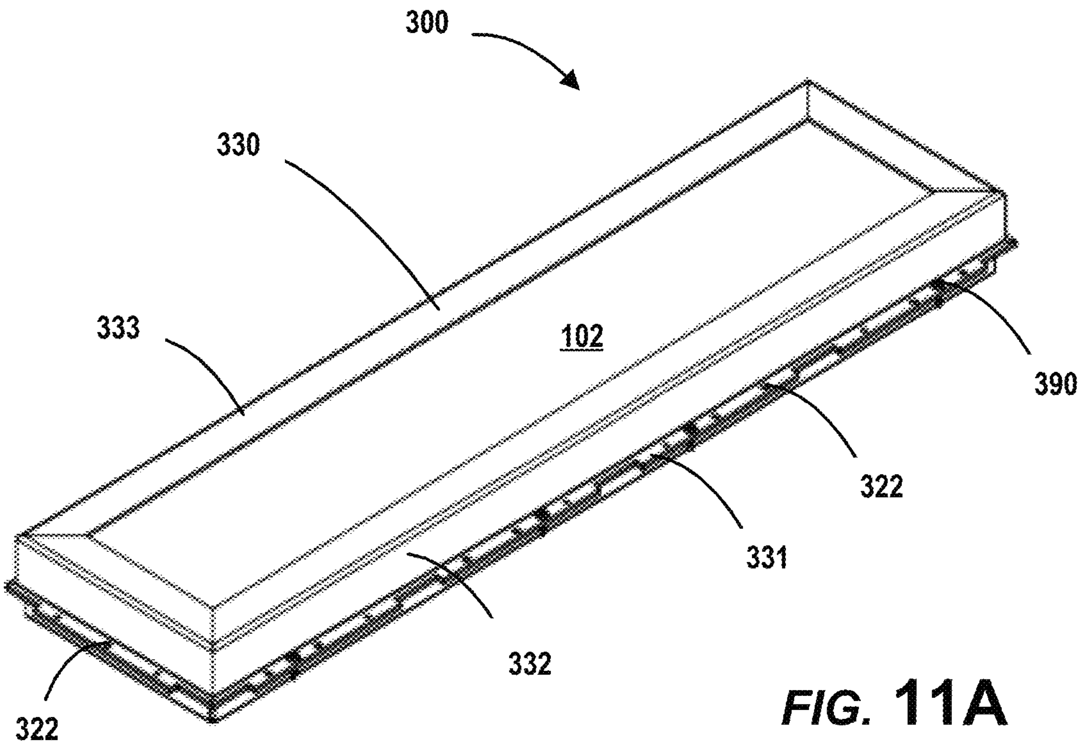
*FIG.* 11A
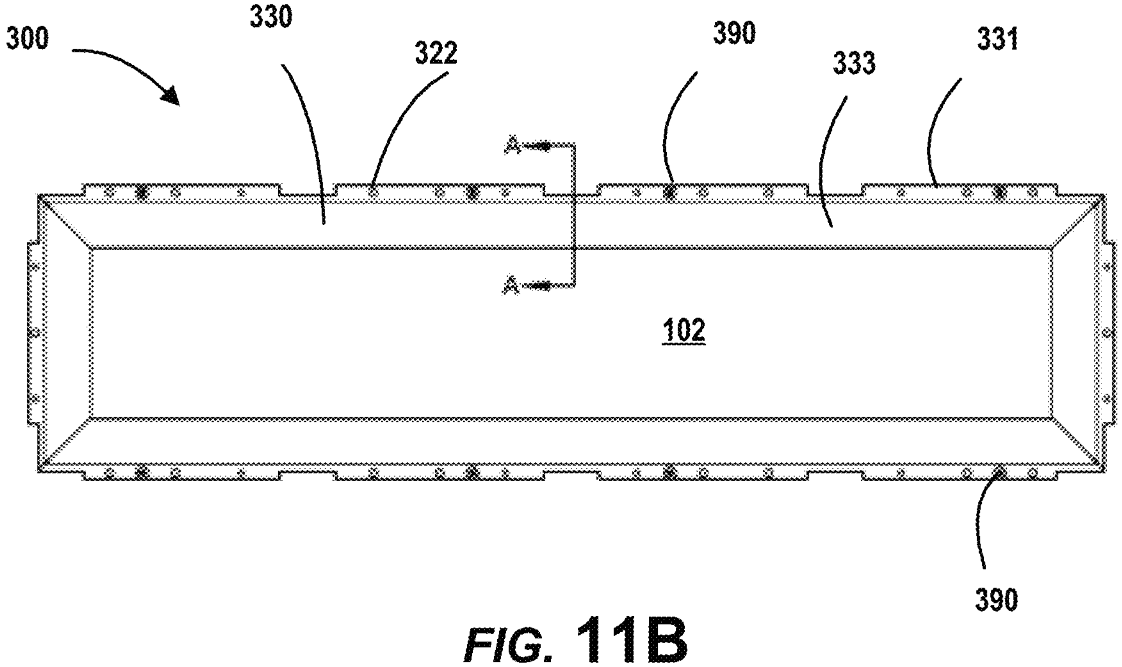
*FIG.* 11B

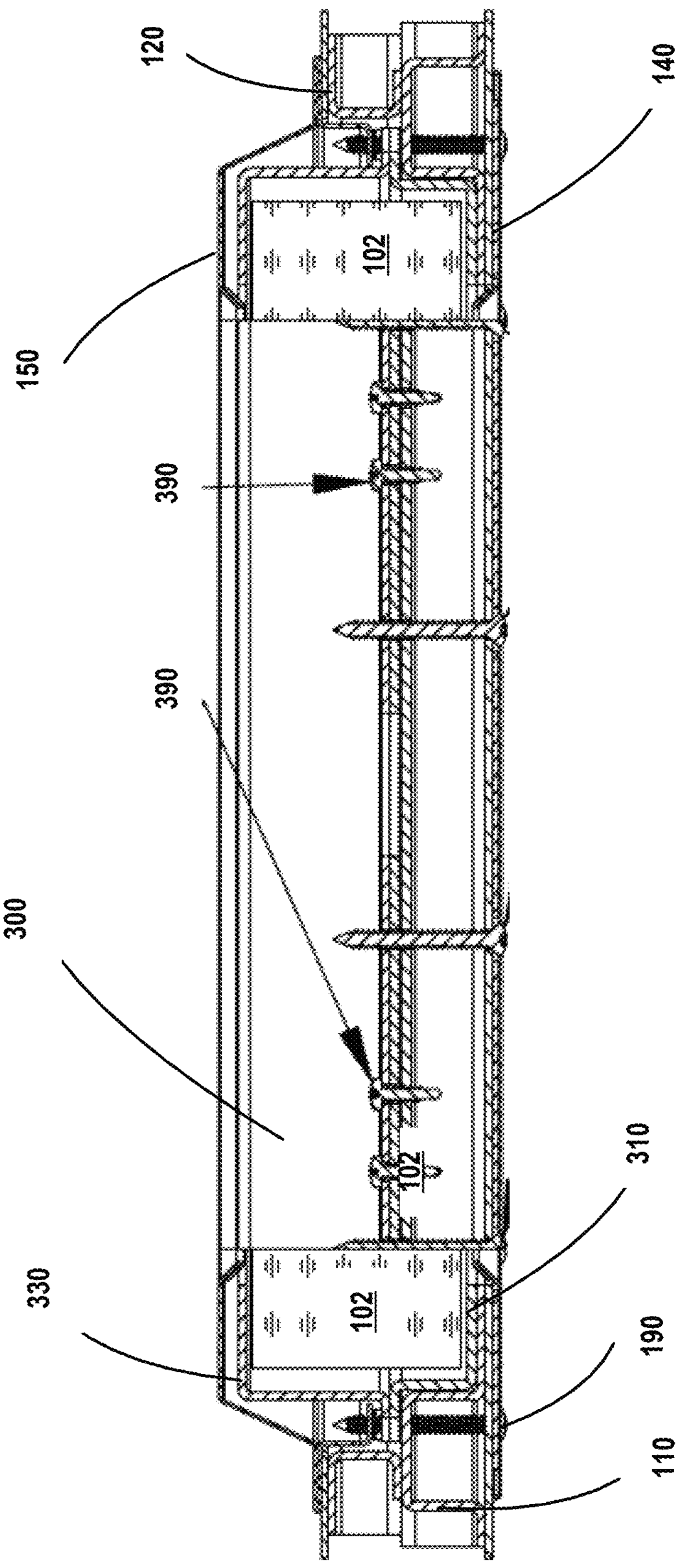
*FIG.* 12B

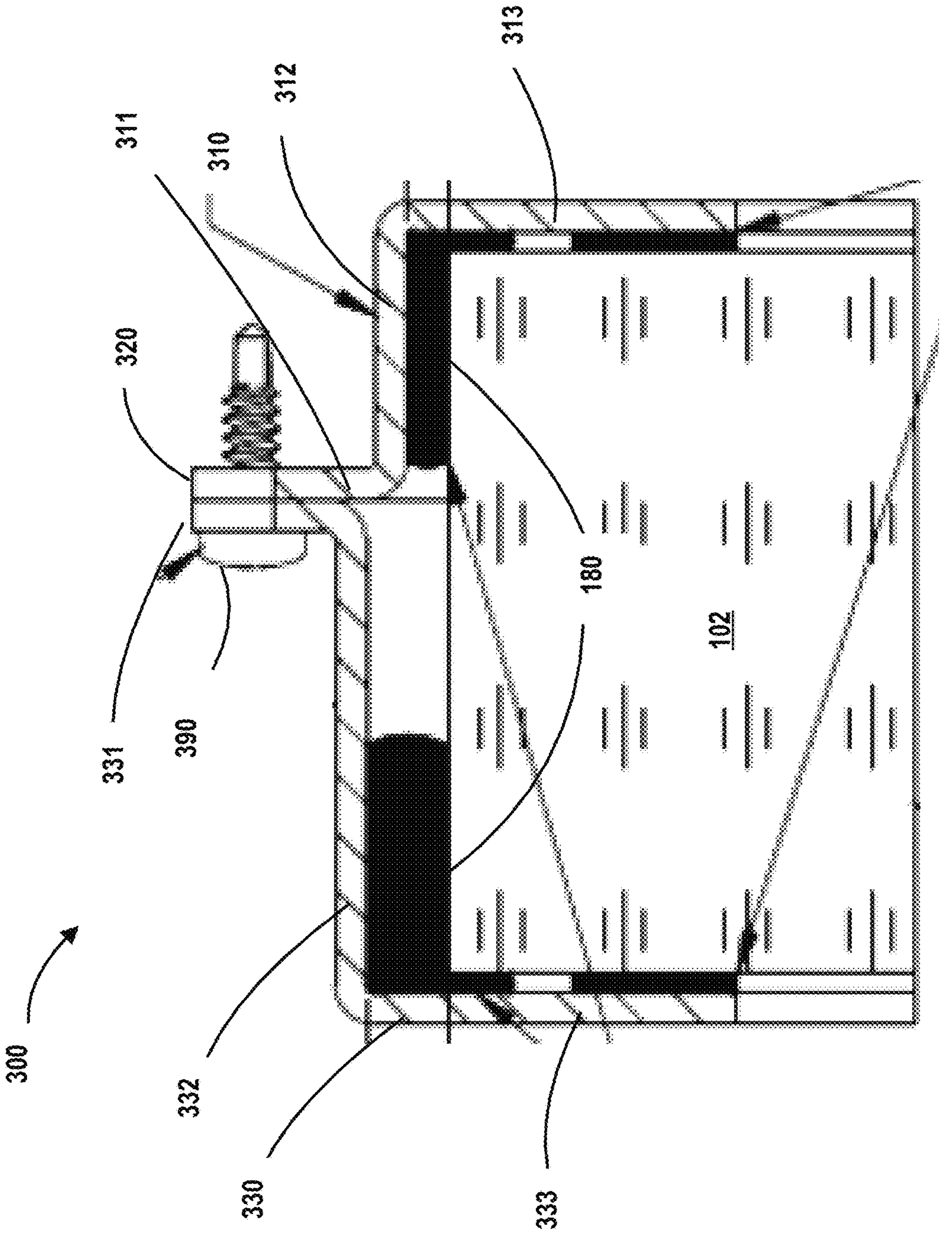
*FIG.* 14C

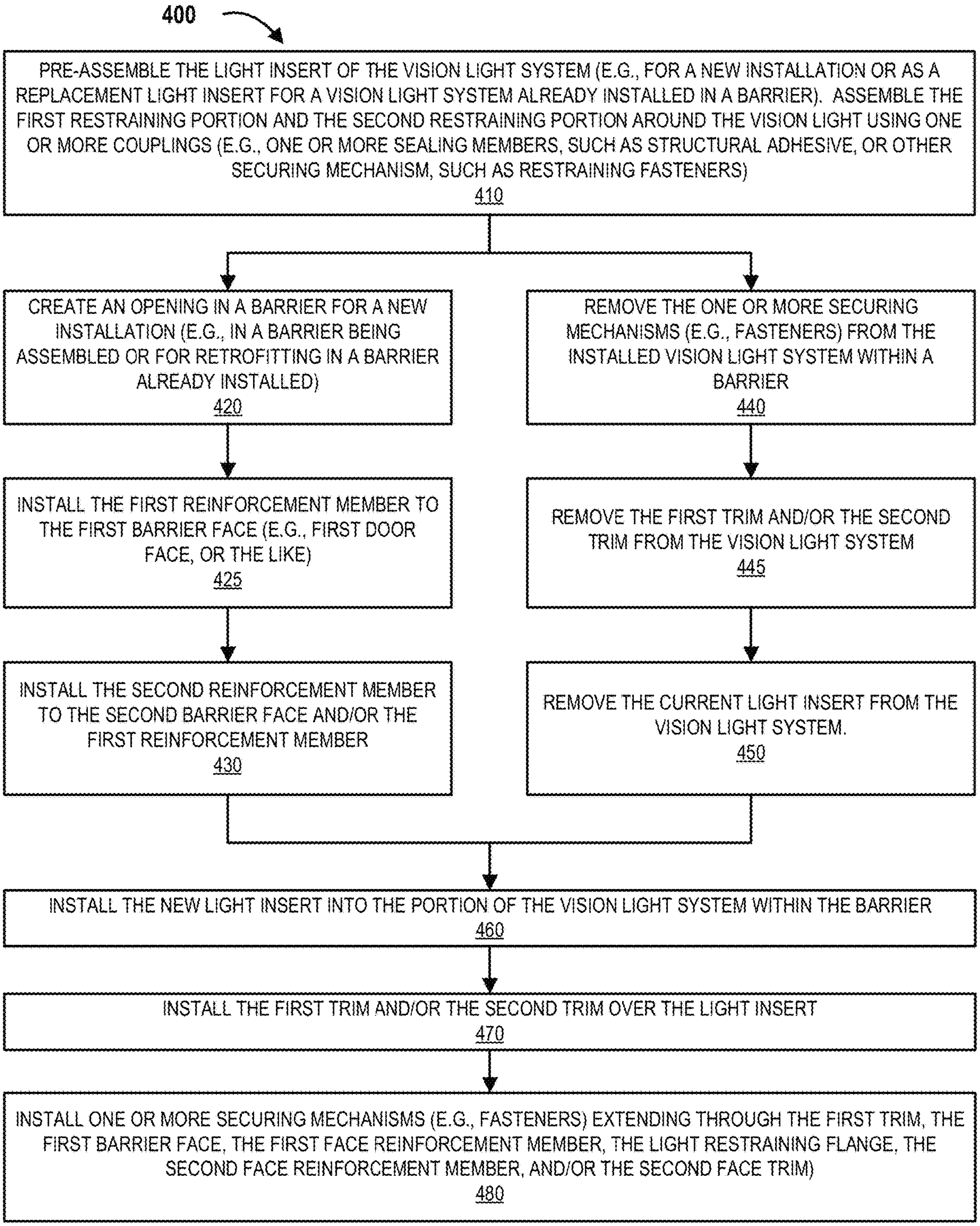
*FIG.* 15

VISION LIGHT SYSTEM FOR BARRIER SYSTEMS

CROSS REFERENCE AND PRIORITY CLAIM UNDER 35 U.S.C. § 119

The present Application for a Patent is a continuation-in-part (CIP) of and claims priority to U.S. patent application Ser. No. 17/015,418 entitled "Vision Light System for Barrier Systems," filed on Sep. 9, 2020, which claims priority to U.S. Provisional Patent Application Ser. No. 62/897,651 entitled "Vision Light System for Barrier Systems," filed on Sep. 9, 2019, all of which are assigned to the assignees hereof and hereby expressly incorporated by reference herein.

FIELD

Embodiments of the present disclosure generally relate to barrier systems and vision light systems, such as barriers that utilize vision lights, including doors, walls, panels, partitions, or the like. In particular, embodiments of the disclosure relate to a door system comprising a vision light system that allows for different sized vision lights to be utilized within the door system.

BACKGROUND

Dwellings, buildings, or other like barrier structures, such as wind, fire, safety, or the like rated structures typically comprise doors, walls, panels, partitions, or the like. The barrier structures may be utilized to provide different levels of protection based on the conditions of the location at which the barrier structure is located. Moreover, in some instances, it is desirable that the barrier structures provide a vision light to allow for viewing the threat side of the barrier from the interior and/or viewing the safe side of the barrier from the exterior.

SUMMARY

As will be described herein, the one or more door systems having a vision light system may be utilized within a barrier structure, and may provide resistance to and protection from the elements, such as but not limited to physical impacts (e.g., penetration from projectiles from ballistics, storms, mob attacks, or the like), protection from fire, protection from fluid penetration (e.g., water, gases, or the like), or other elements. The vision light systems of the door systems may be customizable in order to provide different rating levels depending on the requirements of the barrier structures. As will be described herein, the vision light systems may utilize one or more interchangeable and/or adjustable components, such as one or more reinforcement members, one or more restraining members, one or more trim members or the like that may be utilized to secure a vision light within the door system in order to provide the desired level of protection. As such, in some embodiments the vision light thickness may be located within the faces (e.g., skins) of the doors, or a portion of the vision light may extend past at least one face of the door.

One embodiment of the present disclosure is a light insert for a vision light system. The light insert comprises a light restraining member comprising a first restraining portion, a second restraining portion, and a light restraining flange. The light insert further comprises a vision light operatively coupled between the first restraining portion and the second retraining portion of the light restraining member. The vision light insert is configured to be assembled before installation into a vision light system for a barrier having a first barrier face and a second barrier face.

In further accord with embodiments, the first restraining portion and the second restraining portion are integrally operatively coupled.

In other embodiments, the first restraining portion and the second restraining portion are separate and operatively coupled to the vision light or each other though one or more couplings.

In yet other embodiments, the one or more couplings comprise a structural sealant.

In still other embodiments, the one or more couplings comprise a fastener extending through the light restraining flange.

In further accord with embodiments, the first restraining portion comprises, a first restraining flange configured to be operatively coupled with a first face reinforcement member of the barrier, a second restraining flange operatively coupled to the first restraining flange and extending over a portion of an edge of the vision light, and a third restraining flange operatively coupled to the second restraining flange and extending over a portion of a first face of the vision light.

In other embodiments, the second restraining portion comprises, a first restraining flange configured to be operatively coupled with a first face reinforcement member of the barrier, a second restraining flange operatively coupled to the first restraining flange and extending over a portion of an edge of the vision light, and a third restraining flange operatively coupled to the second restraining flange and extending over a portion of a second face of the vision light.

In still other embodiments, the first restraining portion is on a safe side of the barrier and the second restraining portion is on a threat side of the barrier.

In yet other embodiments, the light restraining flange is configured to be operatively coupled with a first face reinforcement member operatively coupled with the first barrier face of the barrier.

In other embodiments, the light insert is configured to be operatively coupled within a second face reinforcement member operatively coupled to the first face reinforcement member and the second barrier face of the barrier.

In further accord with embodiments, a portion of the vision light and a portion of the light restraining member are configured to extend past the first barrier face or the second barrier face of the barrier.

In other embodiments, the portion of the vision light extends past the second barrier face, wherein a vision light thickness is greater than a barrier thickness formed by the first barrier face and the second barrier face.

In still other embodiments, a first face trim is configured to be operatively coupled to the first face reinforcement member, a second face trim is configured to be operatively coupled to the light restraining member, and the light insert is configured to be operatively coupled to first face reinforcement member using a plurality of fasteners that extend through the first face trim, the first face reinforcement member, the light restraining flange, and the second face trim.

In yet other embodiments, the light insert is configured to be removed and replaced from the vision light system without removing the vision light system from the barrier.

Another embodiment of the present disclosure is a barrier system that comprises a first barrier face, a second barrier face, and a vision light system operatively coupled to the first barrier face and the second barrier face. The vision light system comprise a first face reinforcement member operatively coupled to the first barrier face and a light insert. The light insert comprises a light restraining member having a first restraining portion, a second restraining portion, and a light restraining flange, and a vision light operatively coupled between the first restraining portion and the second retraining portion. The light insert is configured to be assembled before installation into the vision light system.

In further accord with embodiments, the first restraining portion and the second restraining portion are separate and operatively coupled to the vision light or each other though one or more couplings.

In other embodiments, the first restraining portion comprises a first restraining flange operatively coupled with the first face reinforcement member of the barrier, a second restraining flange operatively coupled to the first restraining flange and extending over a portion of an edge of the vision light, and a third restraining flange operatively coupled to the second restraining flange and extending over a portion of a first face of the vision light.

In still other embodiments, the second restraining portion comprises a first restraining flange operatively coupled with the first face reinforcement member of the barrier, a second restraining flange operatively coupled to the first restraining flange and extending over a portion of an edge of the vision light, and a third restraining flange operatively coupled to the second restraining flange and extending over a portion of a second face of the vision light.

In yet other embodiments, the vision light system further comprises a first face trim, a second face trim, and a plurality of fasteners. The first face trim is operatively coupled to the first face reinforcement member, the second face trim is operatively coupled to the light restraining member, and the light insert is operatively coupled to first face reinforcement member using a plurality of fasteners that extend through the first face trim, the first face reinforcement member, the a light restraining flange, and the second face trim.

Another embodiment of the present disclosure is a method for installing a light insert into a portion of a vision light system in a barrier. The barrier comprises a first barrier face operatively coupled to a second barrier face. The vision light system comprises a first face reinforcement member operatively coupled to the first barrier face and a light insert. The light insert comprises a light restraining member having a first restraining portion, a second restraining portion, and a light restraining flange, and a vision light operatively coupled between the first restraining portion and the second retraining portion. The method comprises installing the light insert into the portion of the vision light system operatively coupled to the barrier. The method further comprises installing a plurality of fasteners for operatively coupling the light insert to the vision light system, wherein the plurality of fasteners extend through the first barrier face, the first face reinforcement member, and the light restraining flange.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1A:
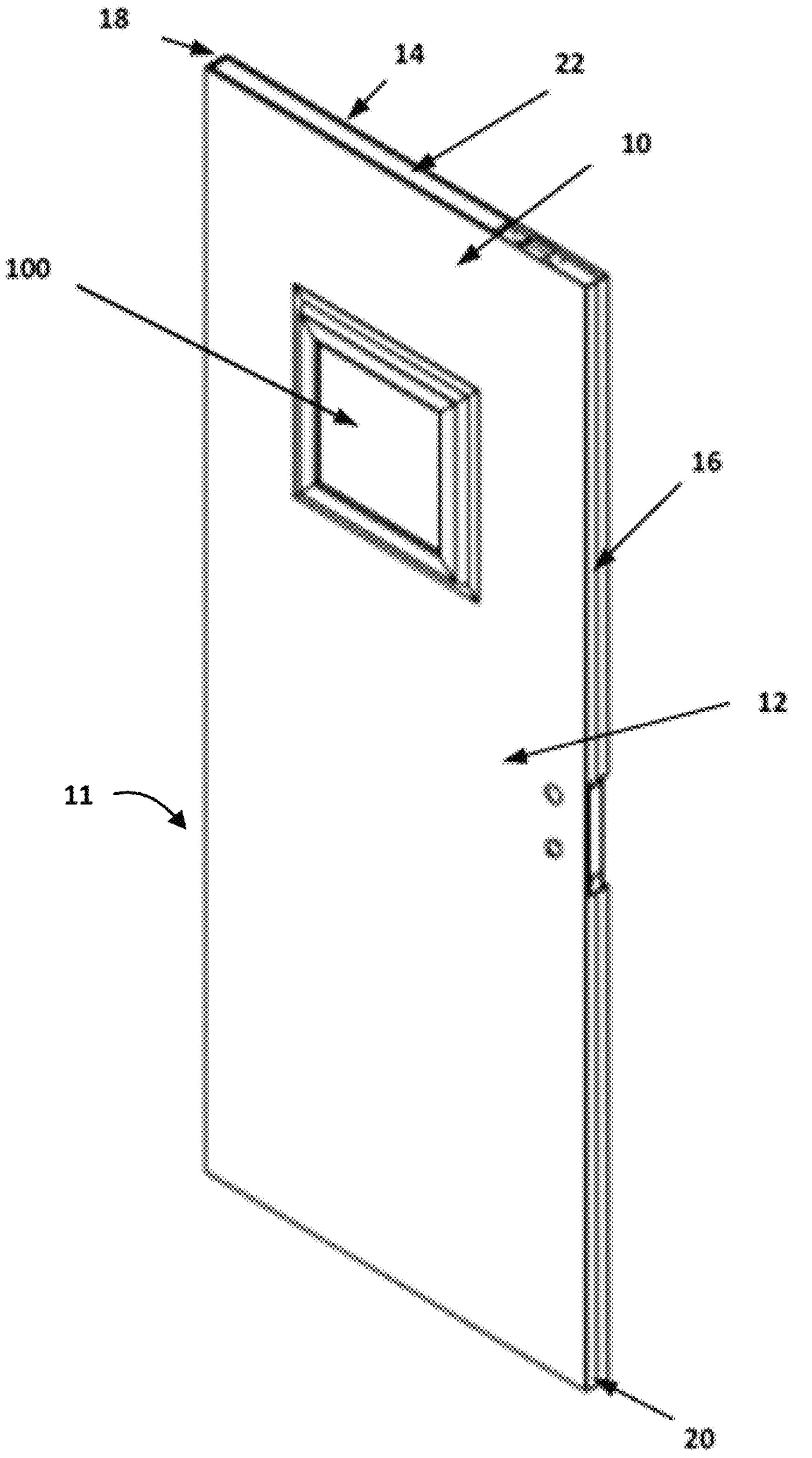

FIG. 1A is a perspective view of a side of a barrier system with a vision light system, in accordance with some embodiments of the disclosure.

FIG. 1B is a perspective view of an opposite side of a barrier system with a vision light system, in accordance with some embodiments of the disclosure.

Figure 2B:
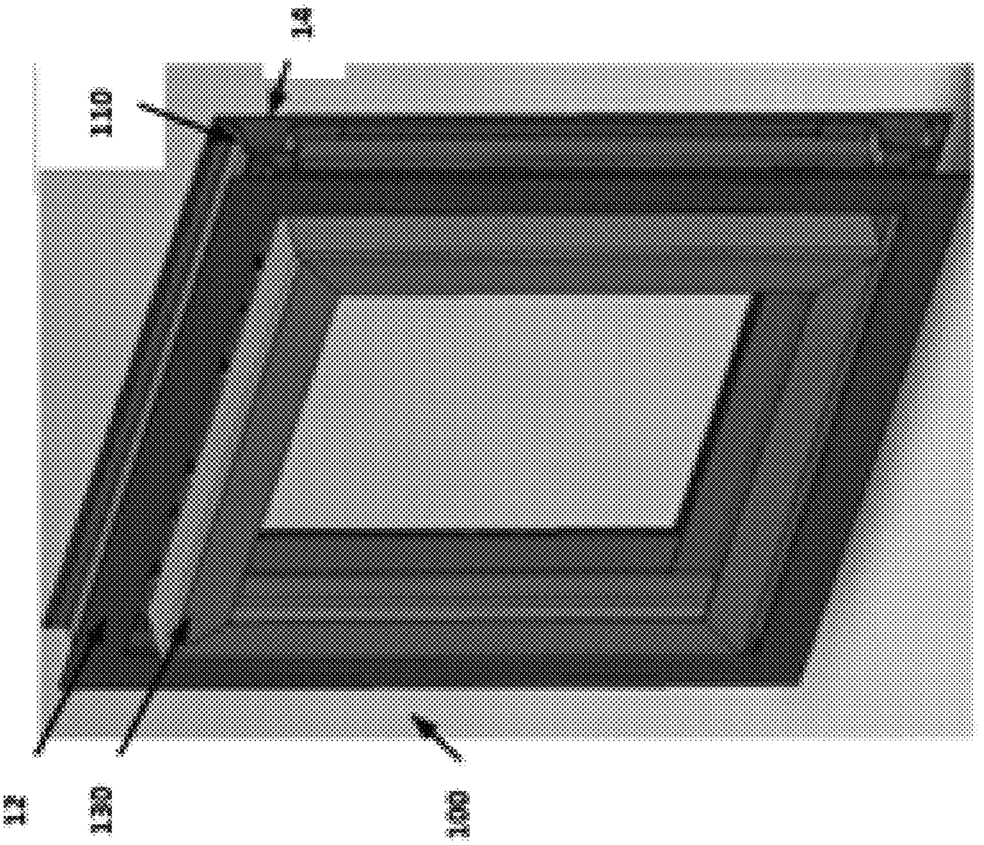
Figure 2A:
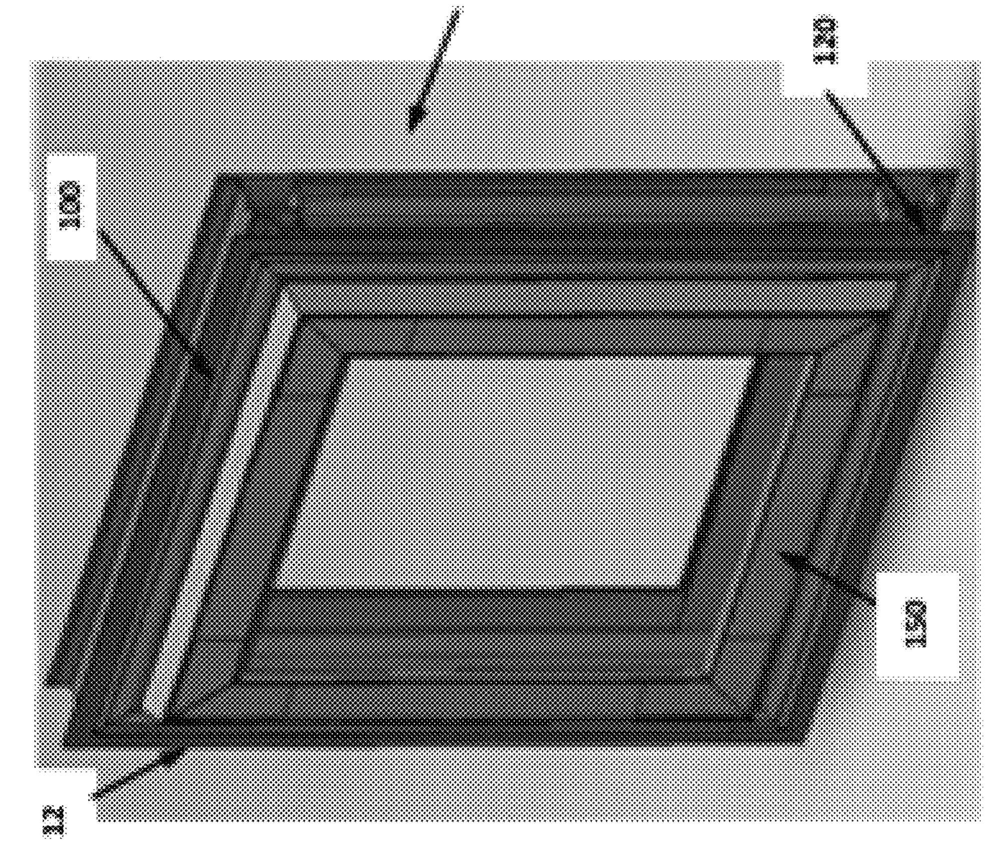

FIG. 2A is a perspective view of a side of a vision light system, in accordance with some embodiments of the disclosure.

FIG. 2B is a perspective view of a side of a vision light system with trim removed, in accordance with some embodiments of the disclosure.

Figure 2C:
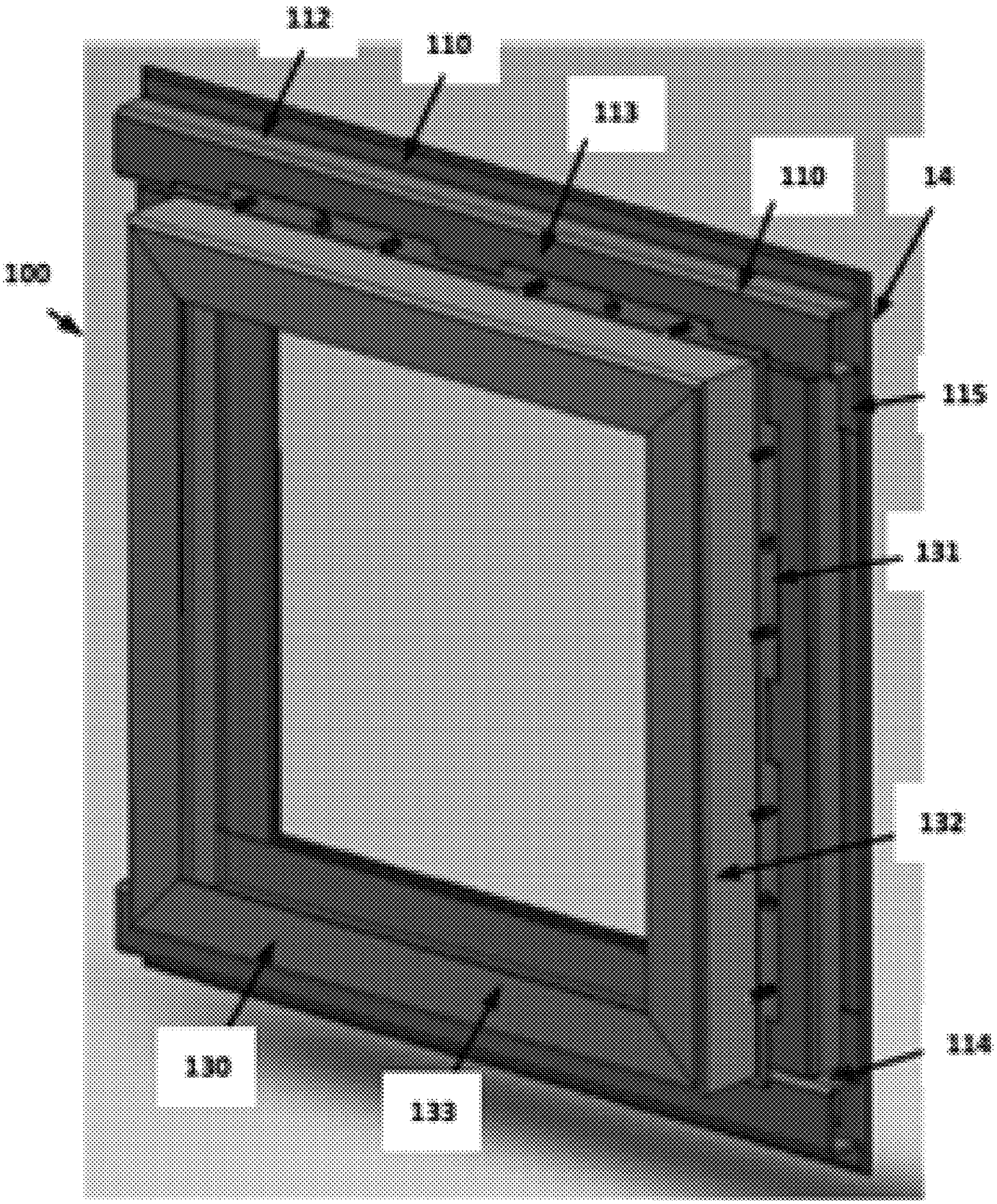

FIG. 2C is a perspective view of a side of a vision light system with a door skin and second reinforcement member removed, in accordance with some embodiments of the disclosure.

Figure 3B:
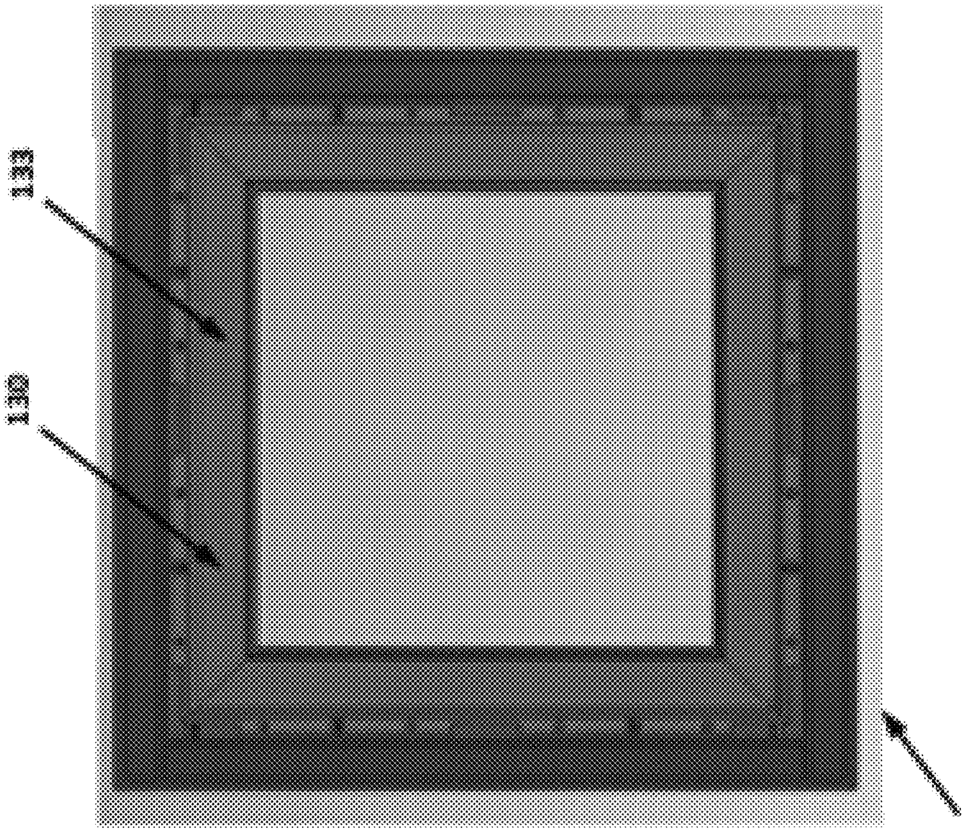
Figure 3A:
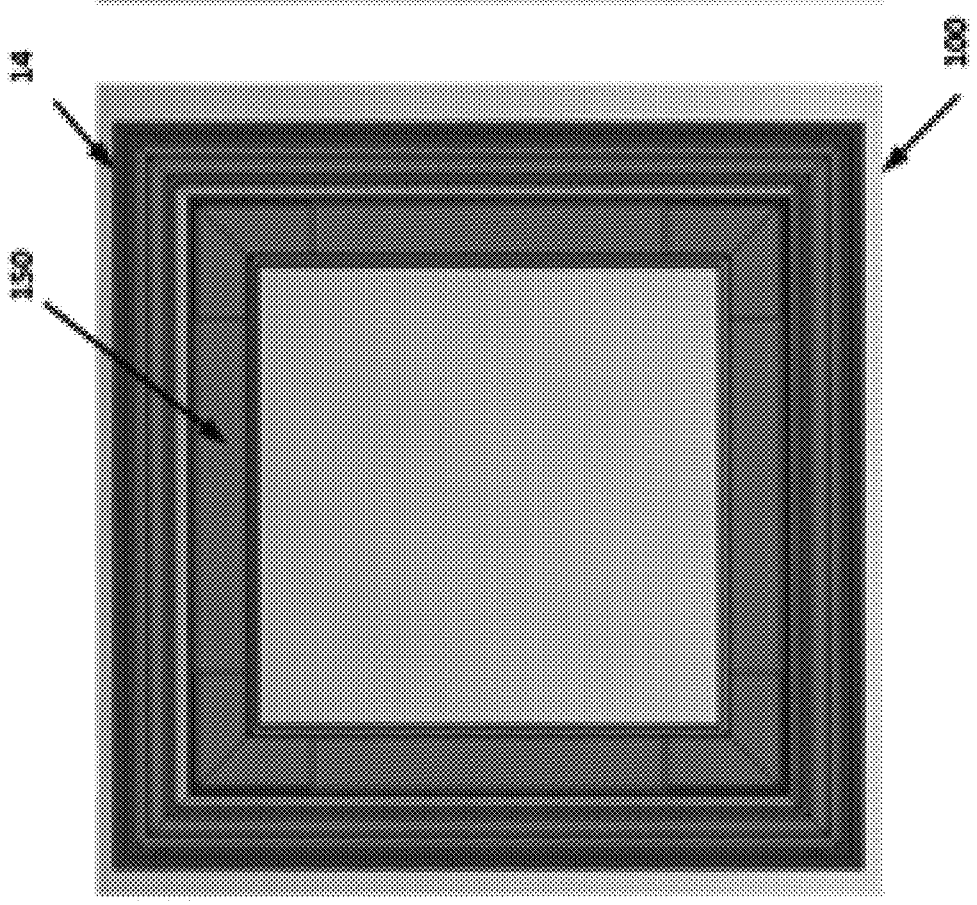

FIG. 3A is a front view of a side of a vision light system, in accordance with some embodiments of the disclosure.

FIG. 3B is a front view of a side of a vision light system with trim removed, in accordance with some embodiments of the disclosure.

Figure 4B:
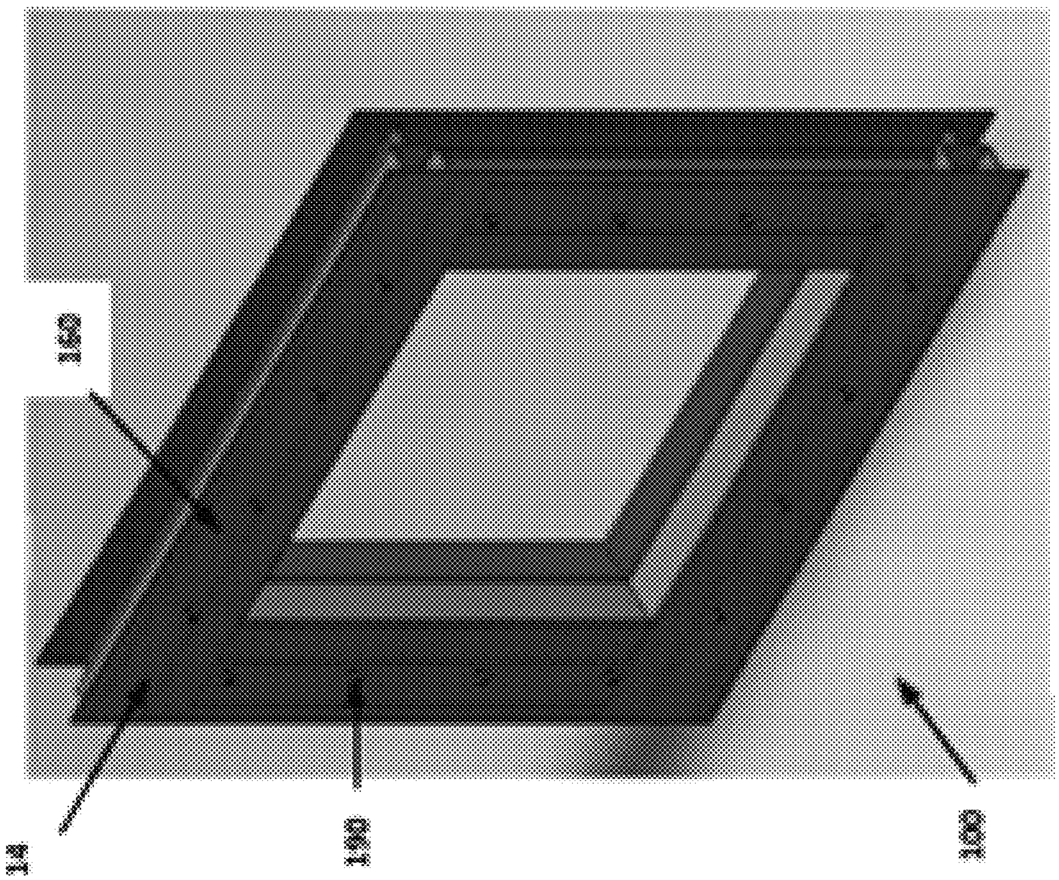
Figure 4A:
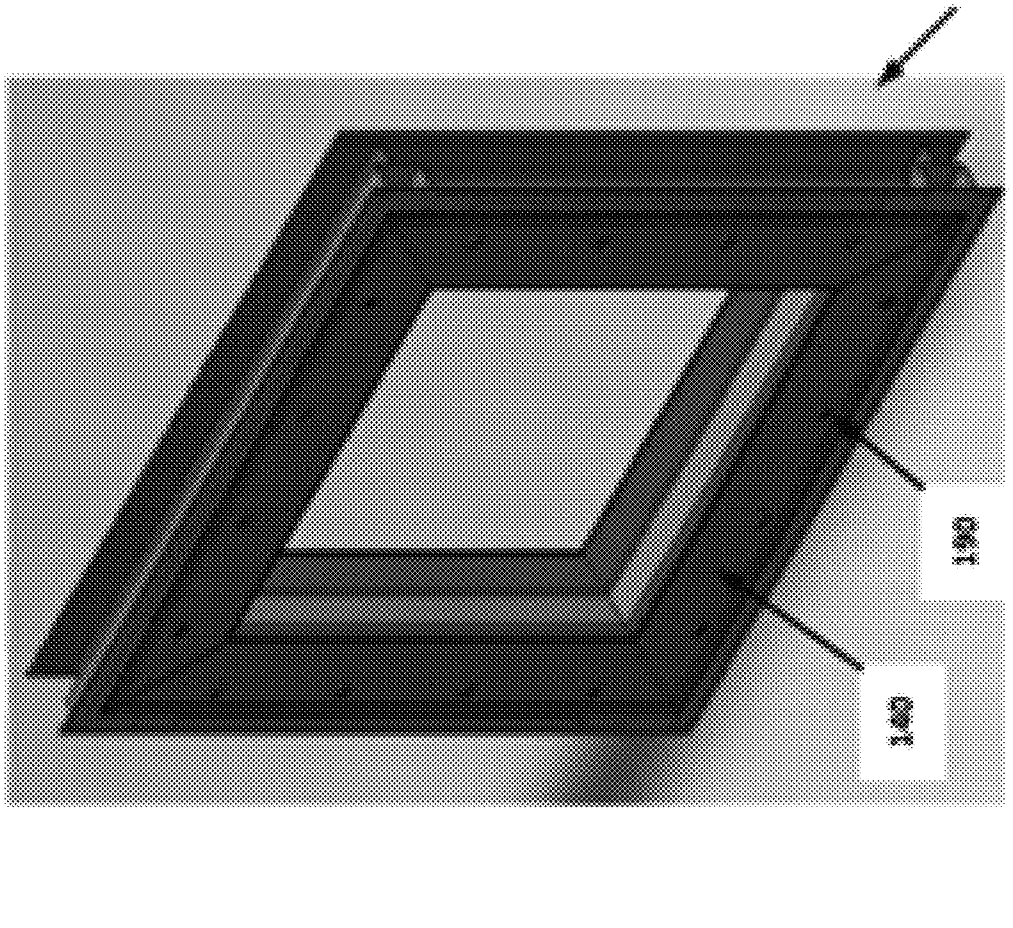

FIG. 4A is a perspective view of an opposite side of a vision light system, in accordance with some embodiments of the disclosure.

FIG. 4B is a perspective view of an opposite side of a vision light system with trim removed, in accordance with some embodiments of the disclosure.

Figure 4C:
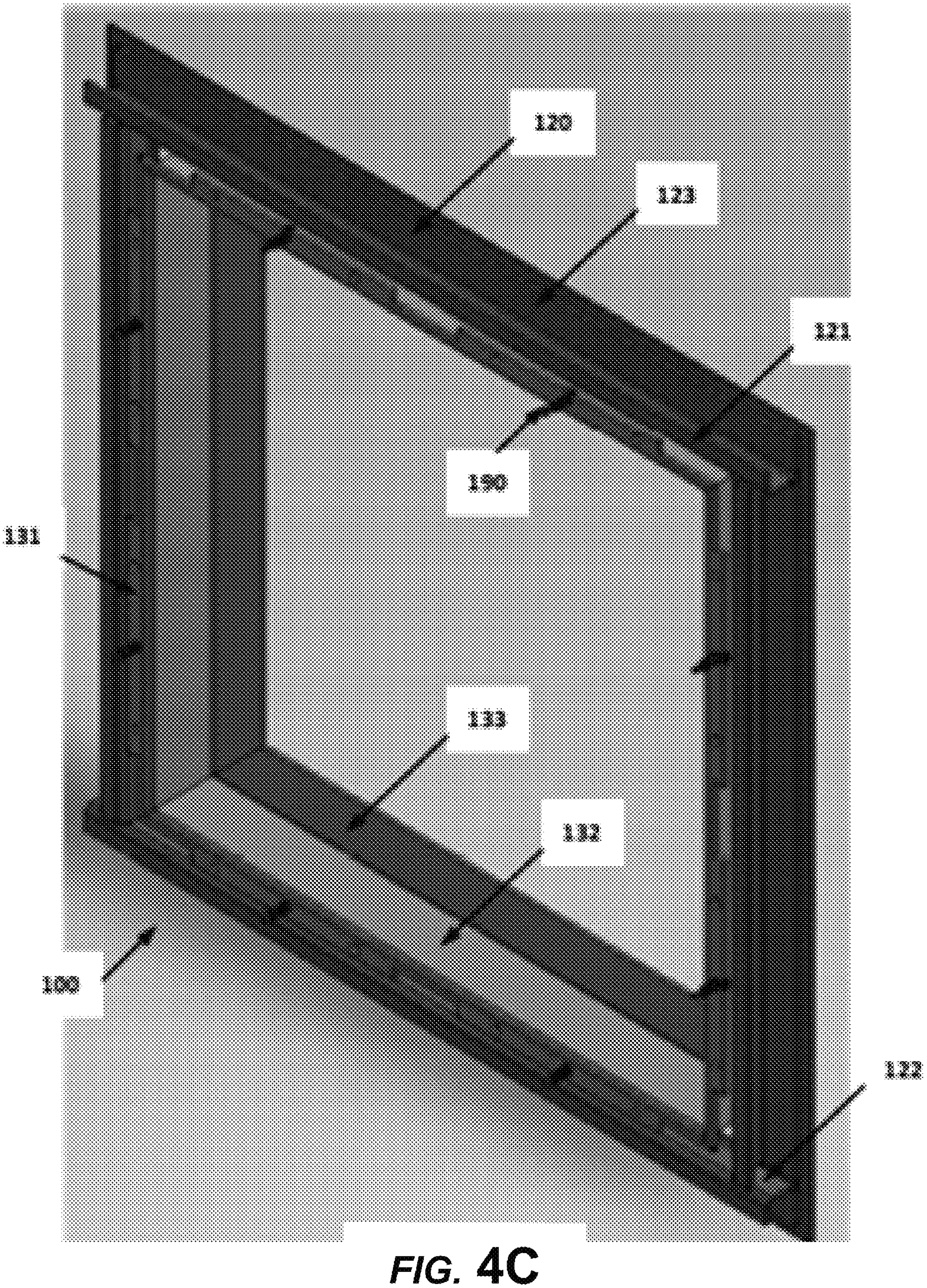

FIG. 4C is a perspective view of an opposite side of a vision light system with a door skin and first reinforcement member removed, in accordance with some embodiments of the disclosure.

Figures 5A, 5B:
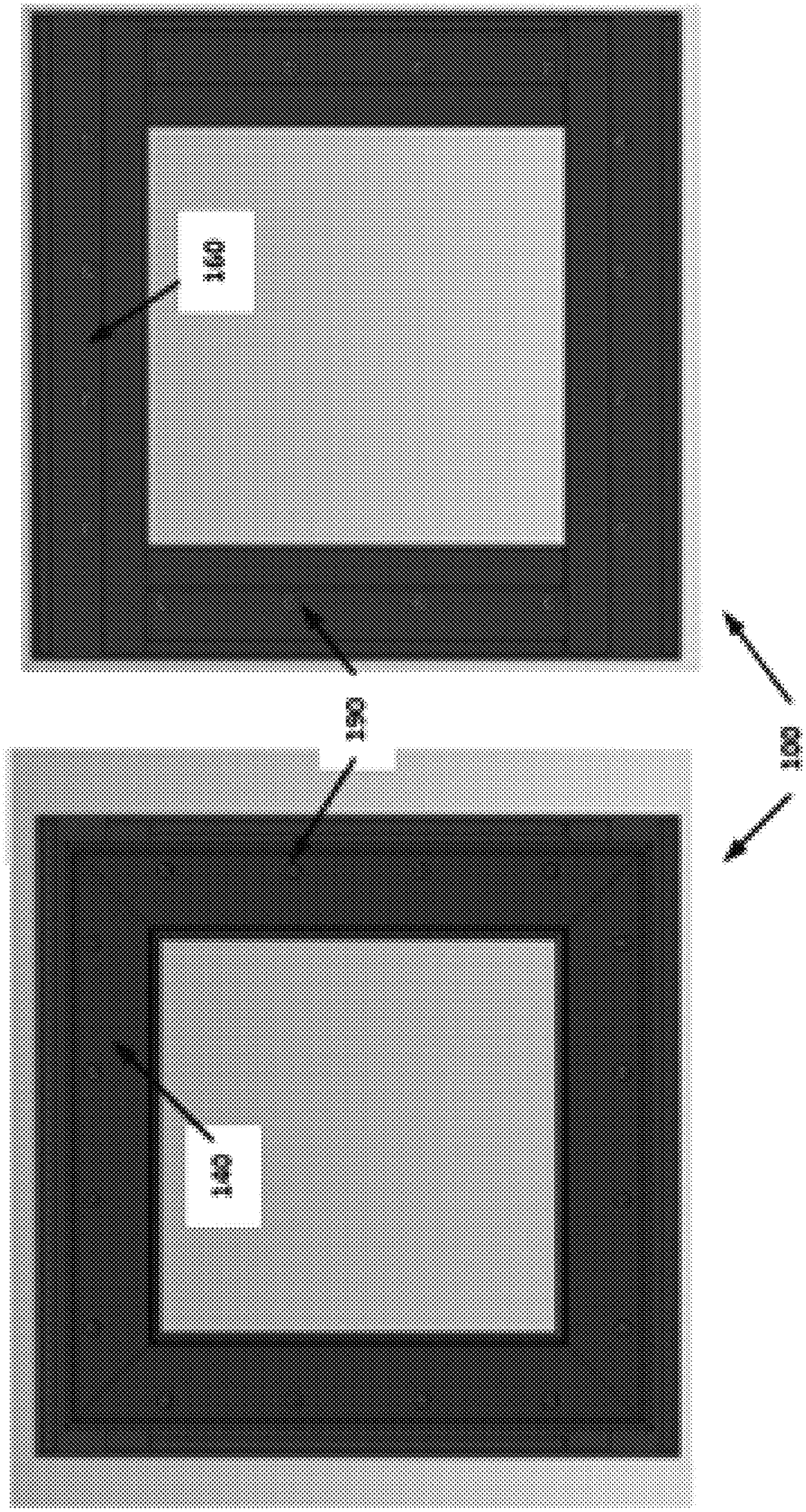

FIG. 5A is a front view of an opposite side of a vision light system, in accordance with some embodiments of the disclosure.

FIG. 5B is a front view of an opposite side of a vision light system with trim removed, in accordance with some embodiments of the disclosure.

FIG. 6A is a perspective cross-sectional view of a vision light system, in accordance with some embodiments of the disclosure.

FIG. 6B is a cross-sectional view of a vision light system, in accordance with some embodiments of the disclosure.

Figure 7A:
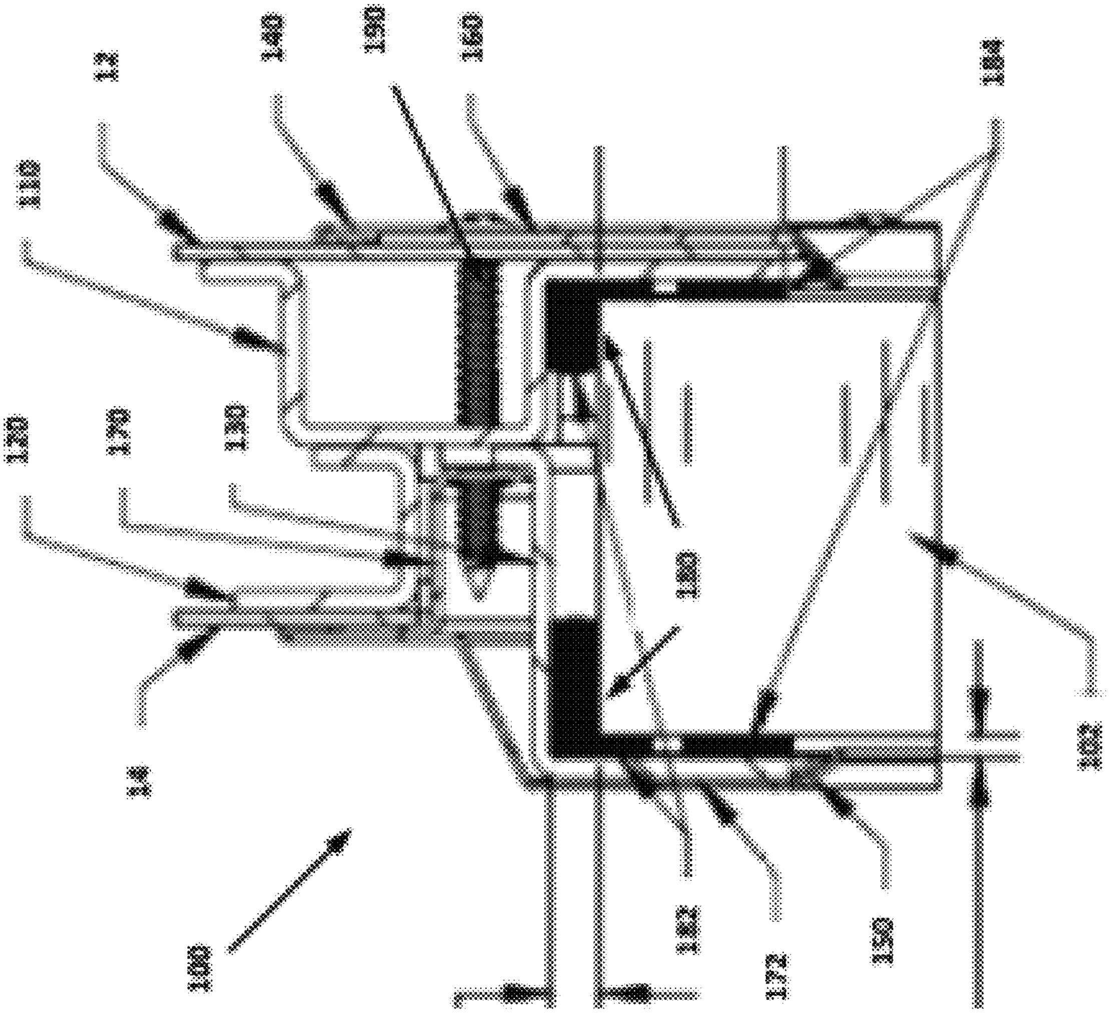

FIG. 7A is an enlarged cross-sectional view of a vision light system, in accordance with some embodiments of the disclosure.

FIG. 7B is an enlarged cross-sectional view of a vision light system, in accordance with some embodiments of the disclosure.

FIG. 8 illustrates a process for selecting a vision light and installing the vision light system in a barrier, in accordance with some embodiments of the disclosure.

Figure 9A:
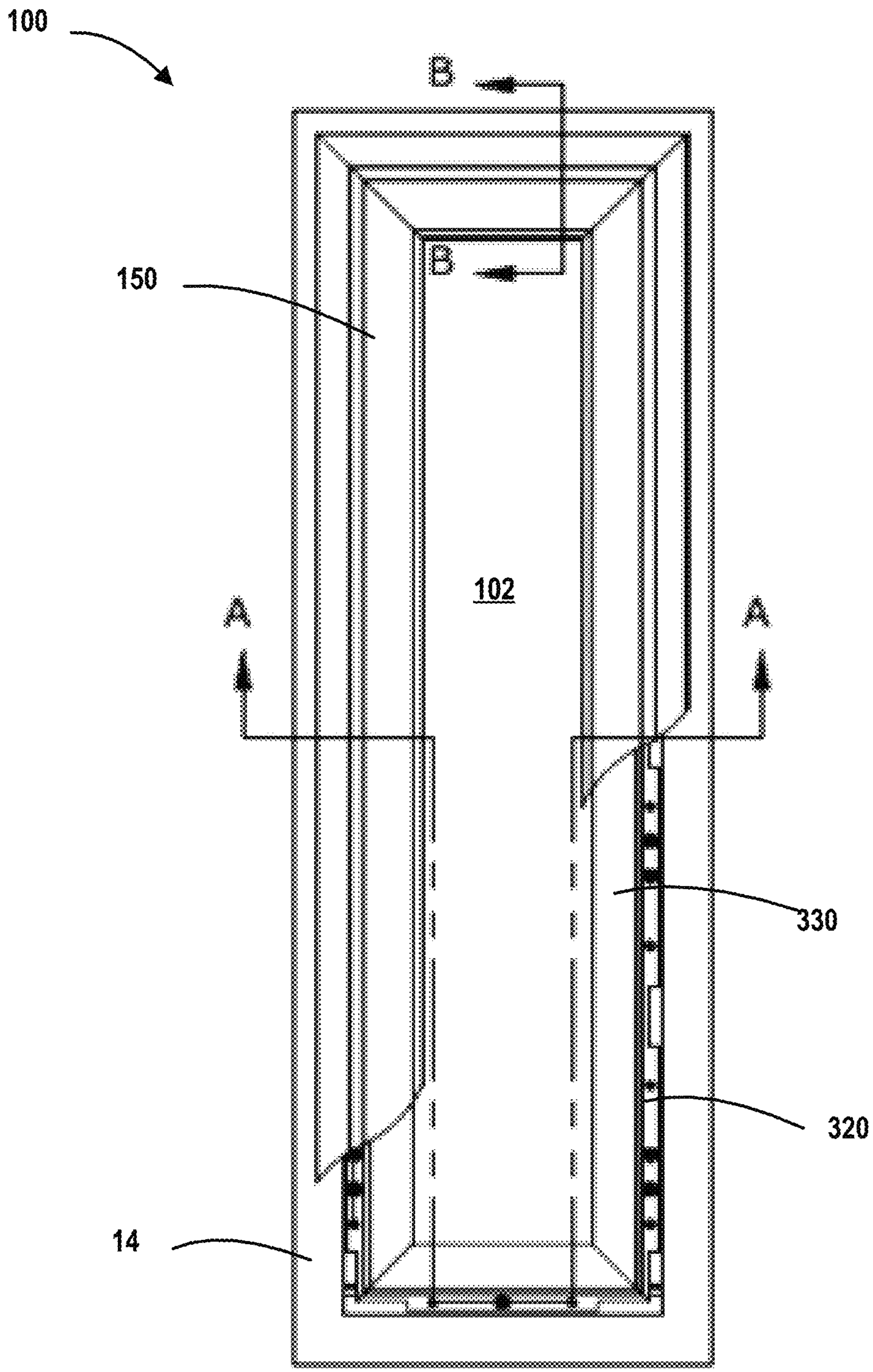

FIG. 9A illustrates a partially cut-away front view of a vision light system, in accordance with some embodiments of the disclosure.

Figure 9B:
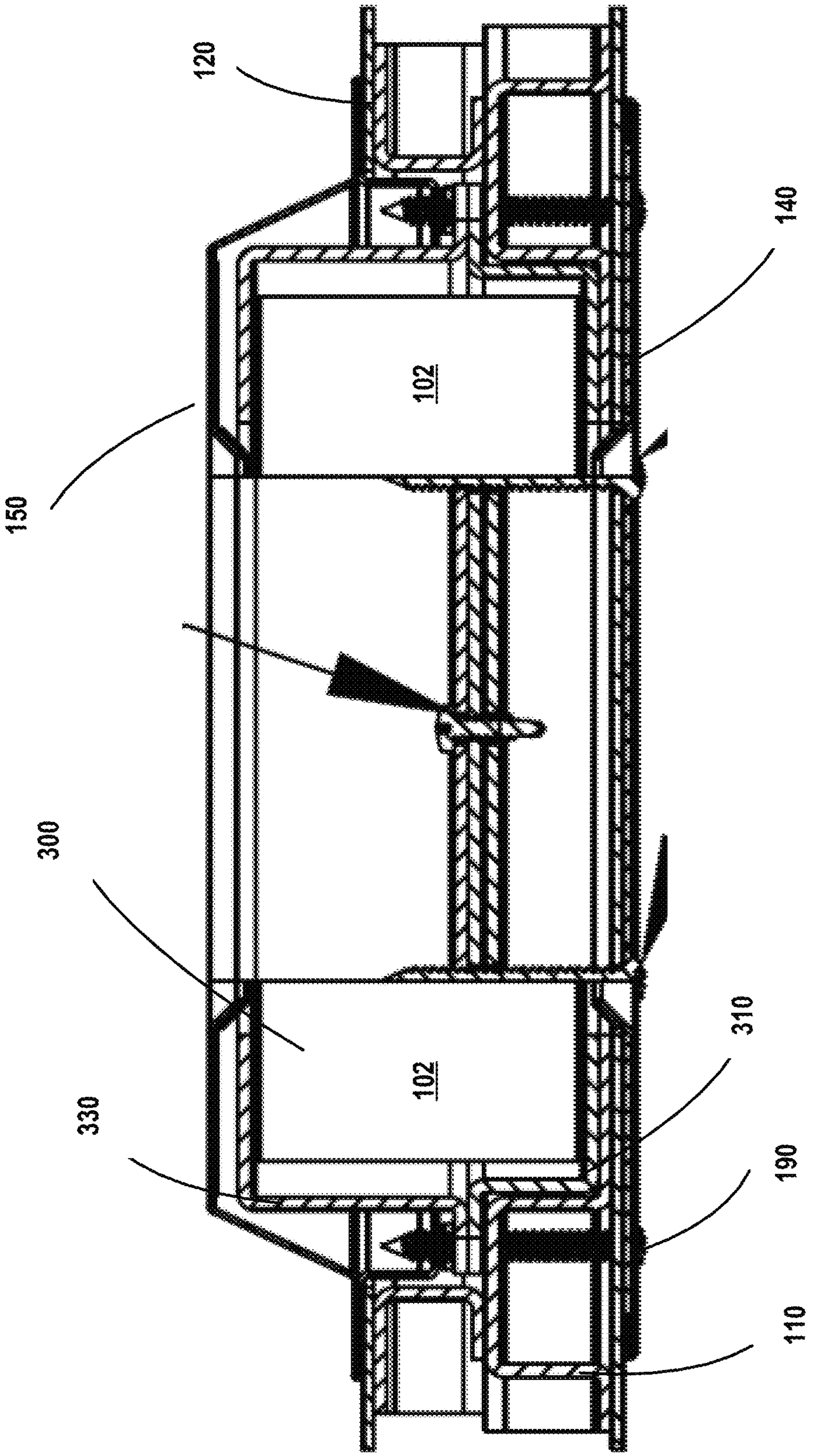

FIG. 9B illustrates a cross-sectional view of the vision light system of FIG. 9A, in accordance with some embodiments of the disclosure.

Figure 10A:
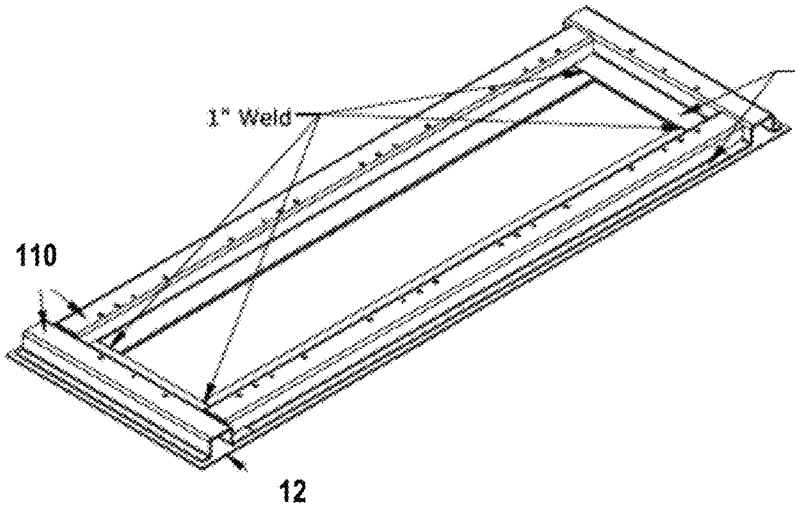

FIG. 9C illustrates a cross-sectional view of the visional light system of FIG. 9A, in accordance with some embodiments of the disclosure FIG. 10A illustrates a perspective view of a first face portion of the vision light system, in accordance with some embodiments of the disclosure.

Figure 10B:
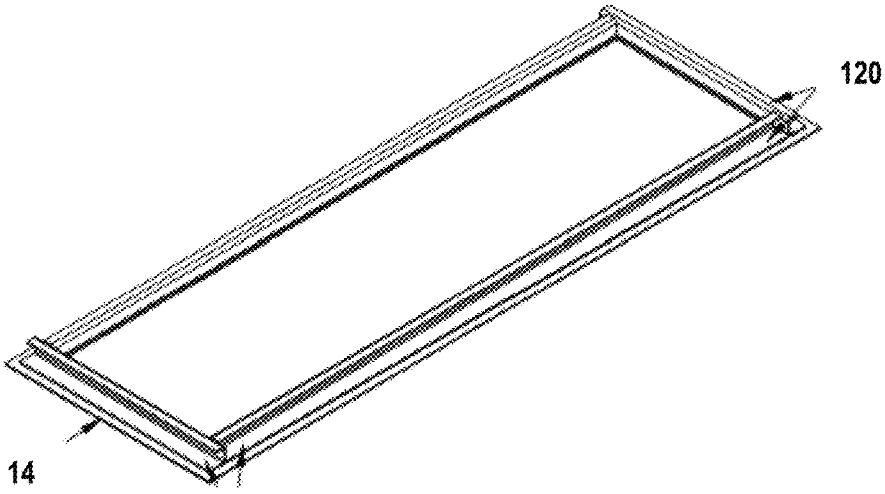

FIG. 10B illustrates a perspective view of a second face portion of the vision light system, in accordance with some embodiments of the disclosure.

Figure 10C:
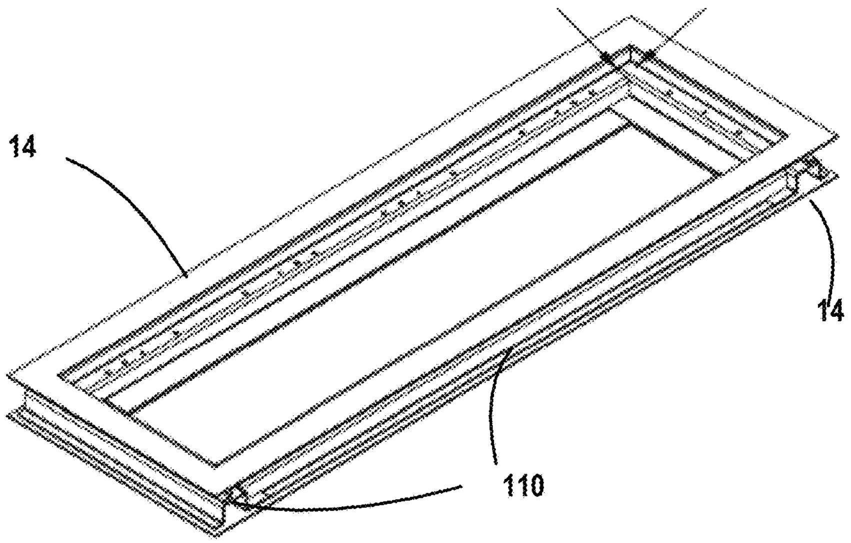

FIG. 10C illustrates a perspective view of a portion of the vision light system without the light insert, in accordance with some embodiments of the disclosure.

FIG. 11A illustrates perspective view of a light insert portion of the vision light system, in accordance with some embodiments of the disclosure.

Figure 11C:
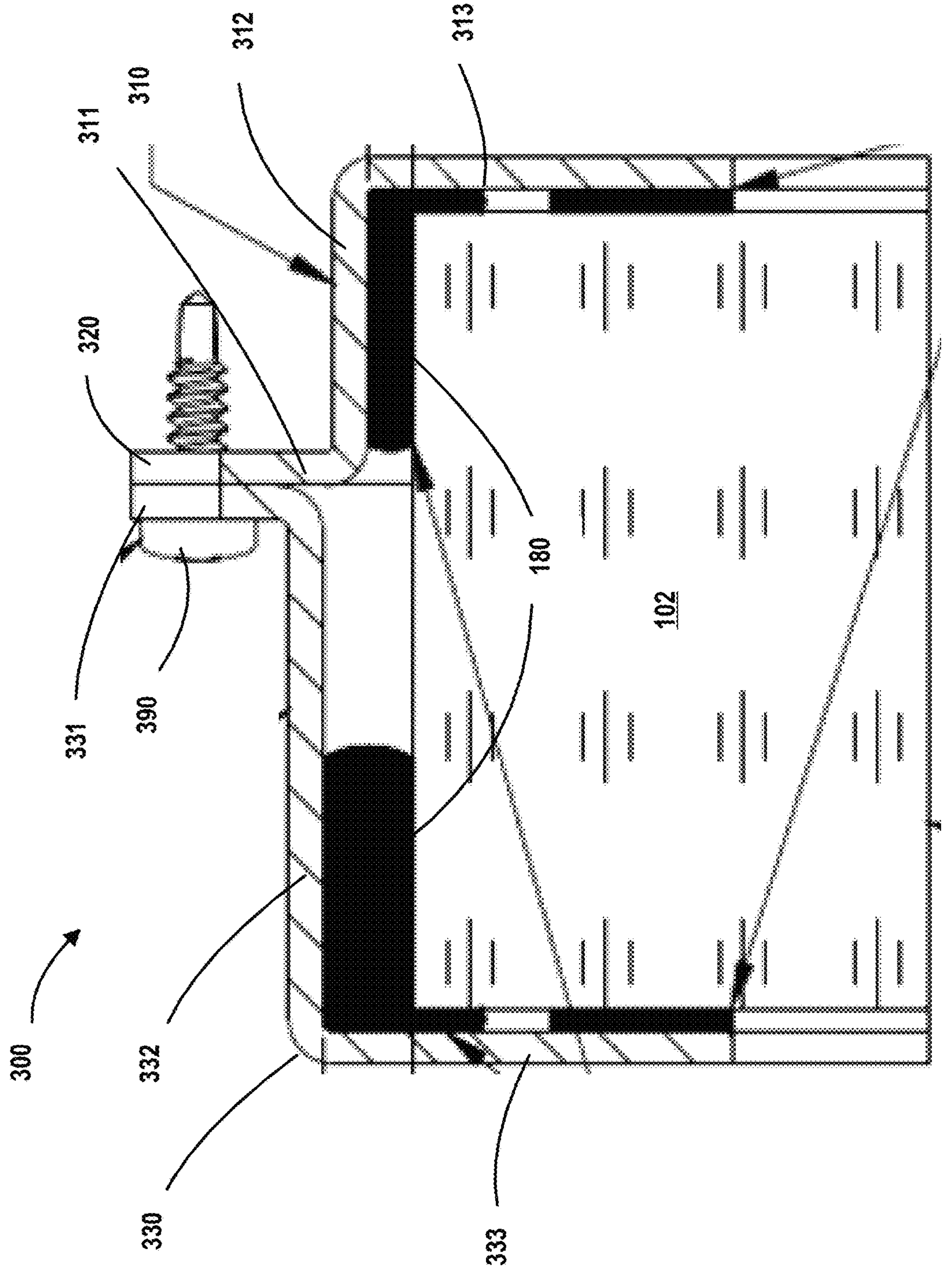
Figure 12A:
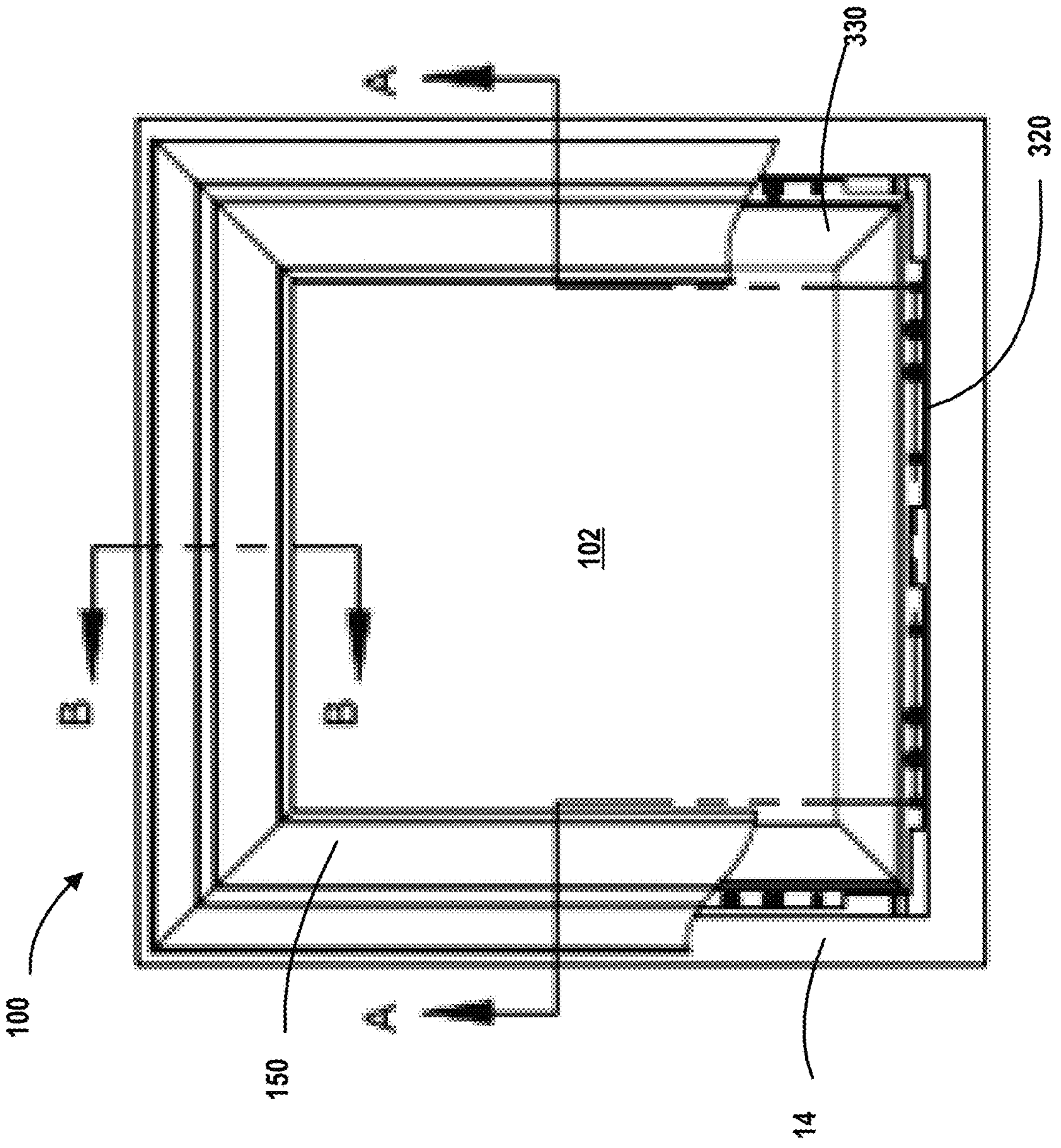

FIG. 11B illustrates a front view of a light insert portion of the vision light system, in accordance with some embodiments of the disclosure FIG. 11C illustrates a cross-sectional view of the light insert of FIG. 11B, in accordance with some embodiments of the disclosure FIG. 12A illustrates a partially cut-away front view of a vision light system, in accordance with some embodiments of the disclosure.

FIG. 12B illustrates a cross-sectional view of the vision light system of FIG. 12A, in accordance with some embodiments of the disclosure.

Figure 12C:
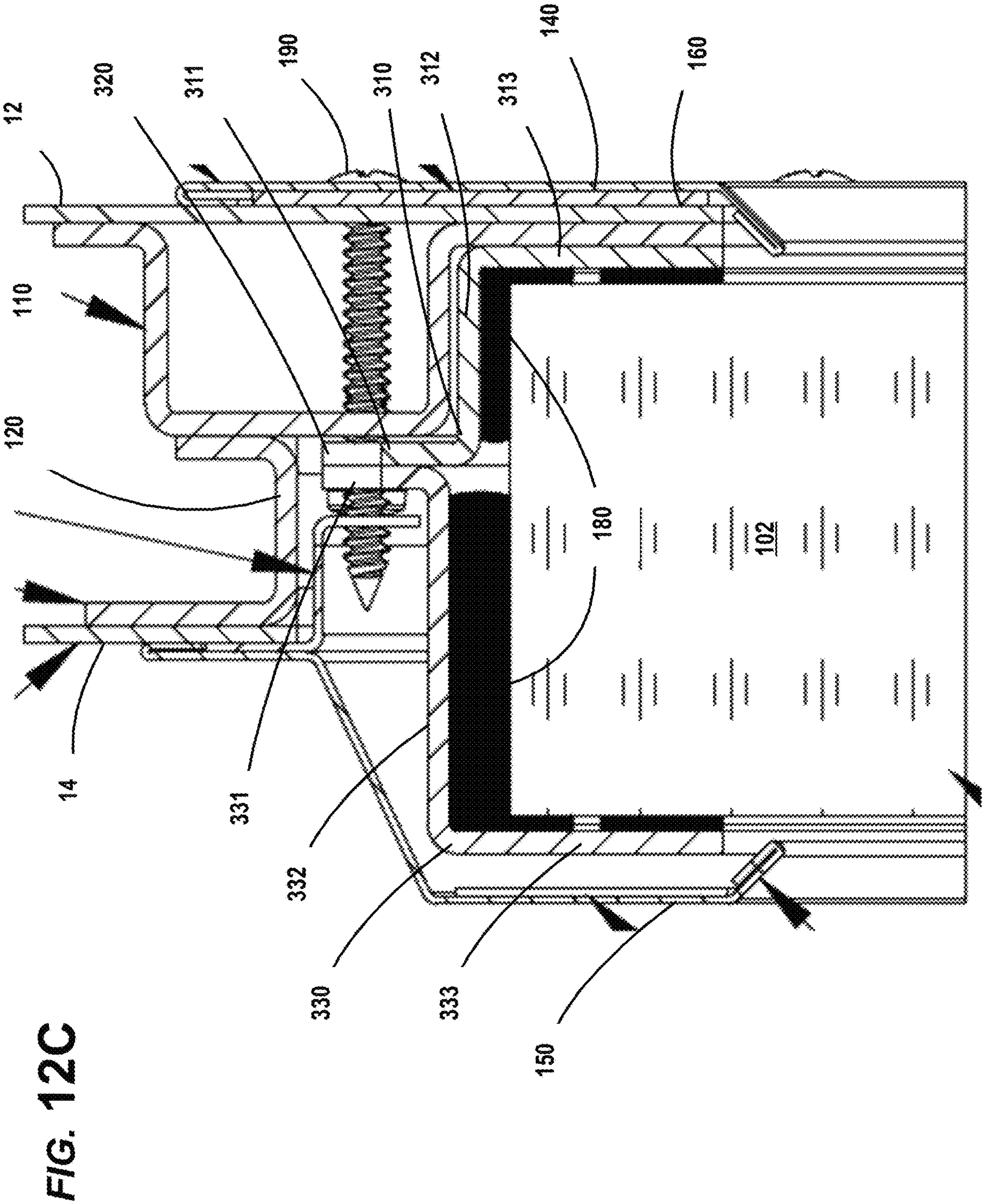

FIG. 12C illustrates a cross-sectional view of the visional light system of FIG. 12A, in accordance with some embodiments of the disclosure.

Figure 13A:
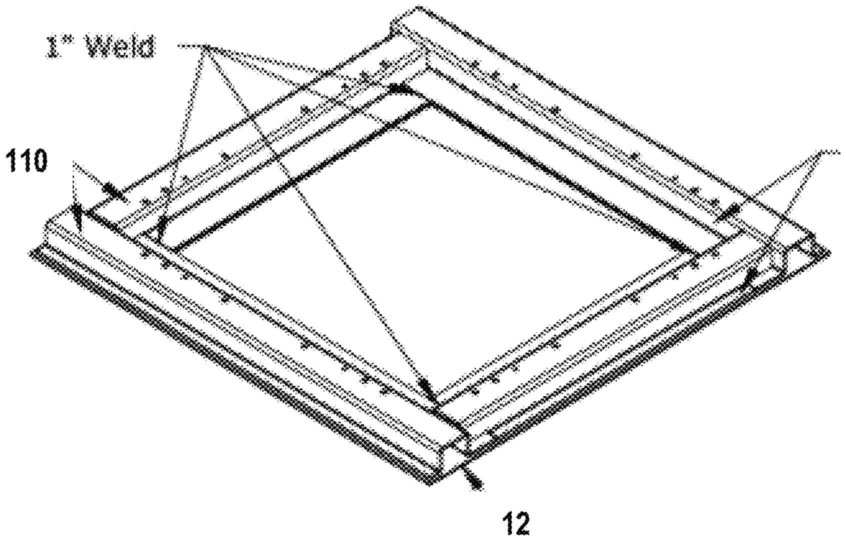

FIG. 13A illustrates a perspective view of a first face portion of the vision light system, in accordance with some embodiments of the disclosure.

Figure 13B:
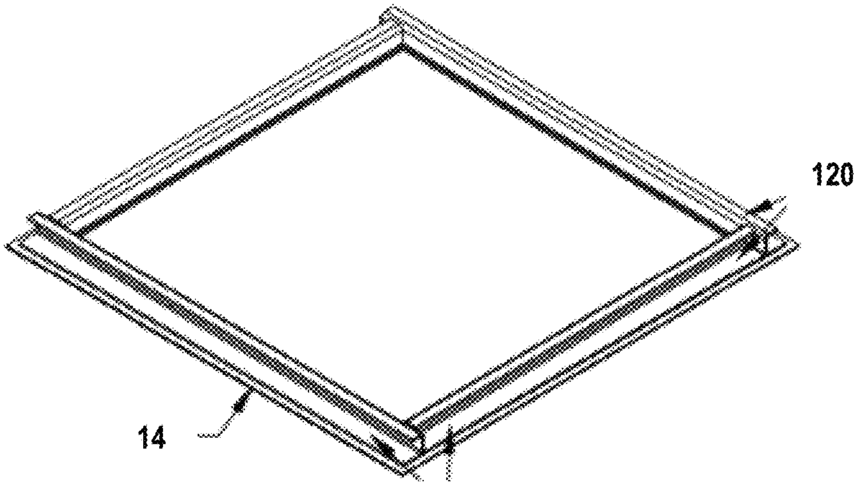

FIG. 13B illustrates a perspective view of a second face portion of the vision light system, in accordance with some embodiments of the disclosure.

Figure 13C:
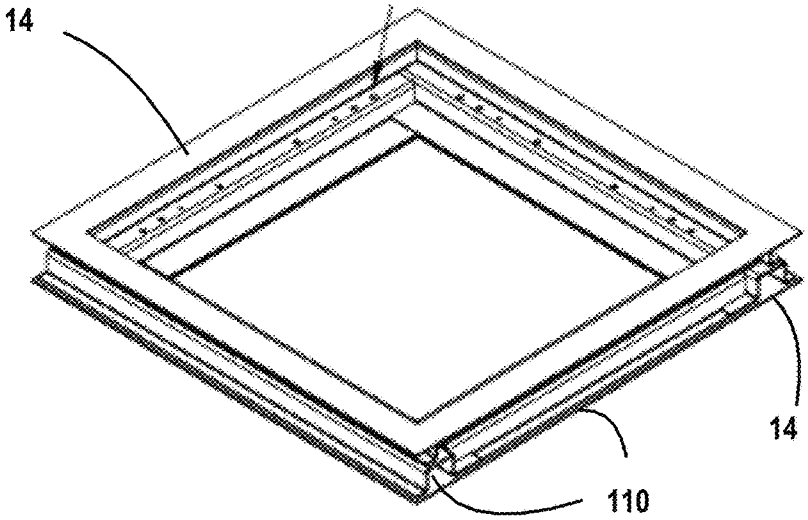

FIG. 13C illustrates a perspective view of a portion of the vision light system without the light insert, in accordance with some embodiments of the disclosure.

Figure 14A:
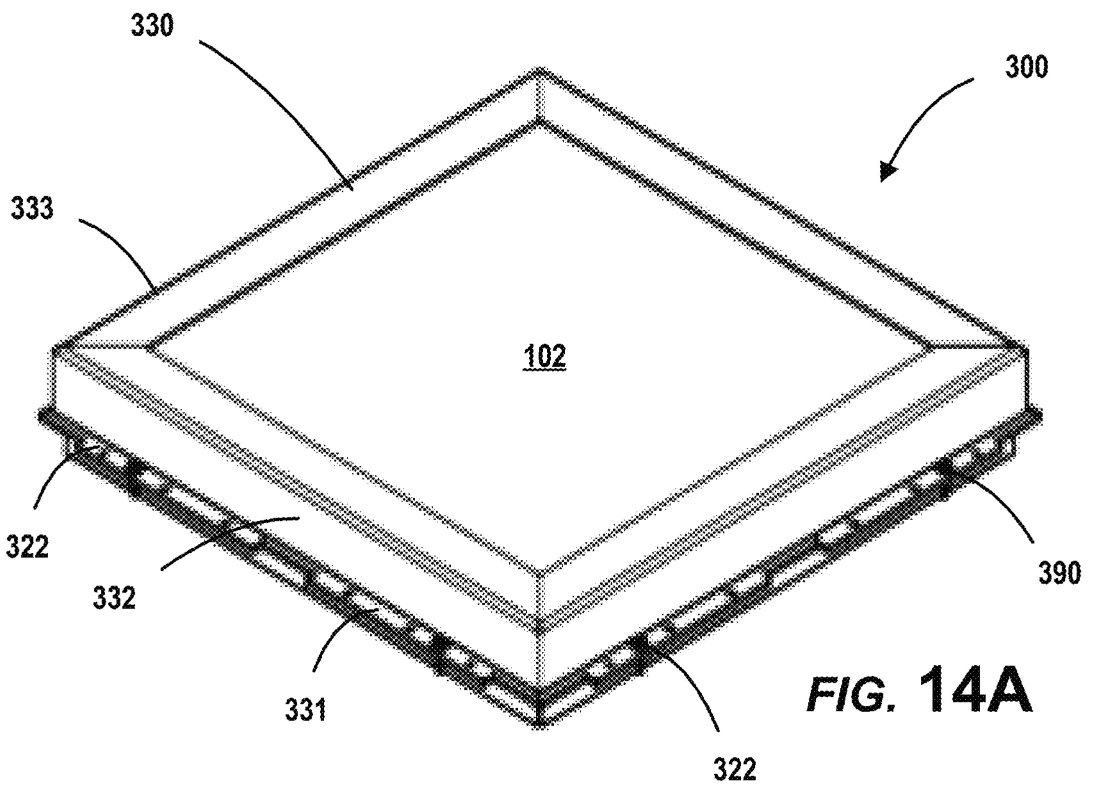

FIG. 14A illustrates perspective view of a light insert portion of the vision light system, in accordance with some embodiments of the disclosure.

Figure 14B:
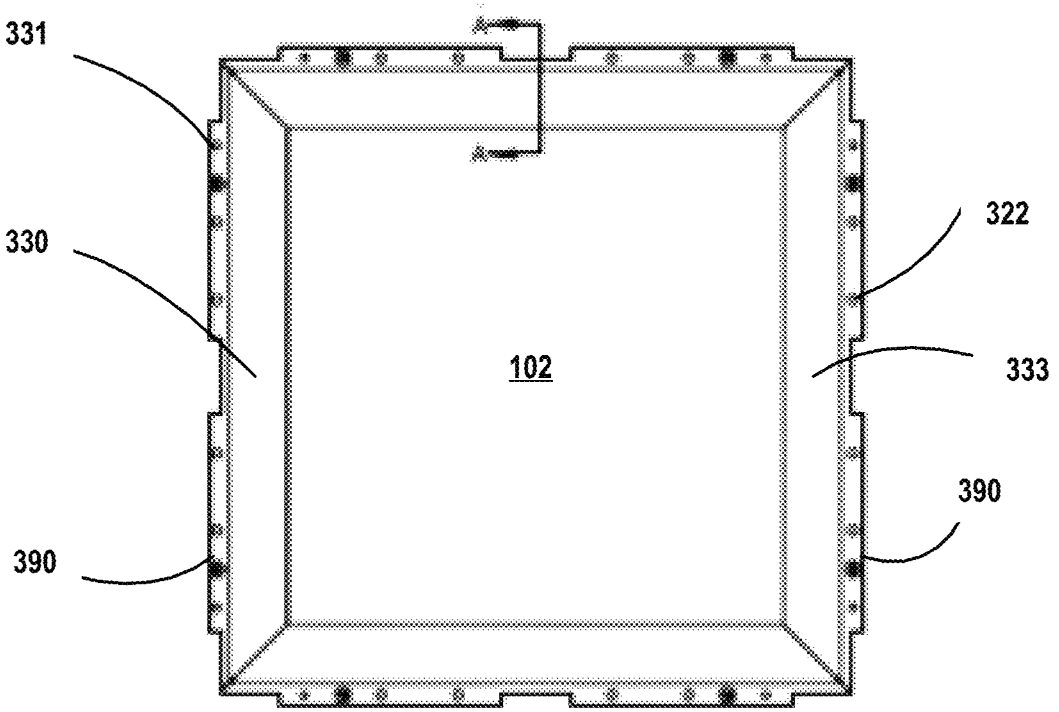

FIG. 14B illustrates a front view of a light insert portion of the vision light system, in accordance with some embodiments of the disclosure.

FIG. 14C illustrates a cross-sectional view of the light insert of FIG. 14B, in accordance with some embodiments of the disclosure.

FIG. 15 illustrates a process for installing a new vision light system in a barrier or replacing a light insert in an installed vision light system, in accordance with some embodiments of the disclosure.

DETAILED DESCRIPTION

The following detailed description teaches specific example embodiments of the invention; however, other embodiments of the invention do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof. Moreover, when the terms "first," "second," "third," and/or the like are used herein to described components, it should be understood that the terms "first," "second," "third," and/or the like may be interchangeable such that the "first" component may alternatively be described as the "second" component, the "third" component, or the like.

As illustrated in FIGS. 1A and 1B, the door system 10 may comprise a door 11 having a first face 12 (e.g., a safe side face), a second face 14 (e.g., a threat side face), a first edge 16 (e.g., a right edge), a second edge 18 (e.g., left edge), a bottom edge 20 (e.g., a lower edge), and/or a top edge 22 (e.g., an upper edge). The faces and/or edges of the door system 10, may alternatively be described as "skins." The skins may be formed of any material, such as but not limited to sheet metal, plastics, composites, or other material. Moreover, one or more of the first face 12, second face 14, first edge 16, second edge 18, bottom edge 20, and/or a top edge 22 may form a cavity within the door 11. The cavity of the door 11 may include a core made from any type of fill material, such as but not limited to foam, concrete, steel, other metals (including alloys thereof), projectile resistant fabrics or plastics, or the like. The fill material may provide resistance to the elements (e.g., projectiles, or the like) as will be discussed herein. The door 11 may be any type of door, including but not limited to a center seem split door, tab and slot door, side seam door (e.g., lock, welded, or the like), or any other type of hollow and/or solid door.

The door system 10 may further comprise a vision light system 100, having a vision light 102. Vision light thicknesses are typically set by the thickness of a door in which the vision lights are used, and as such, doors are manufactured for use with a vision light of a specific thickness. Alternatively, unlike the typical vision lights, the present disclosure allows for vision lights 102 of different thicknesses to be installed in the door system 10 depending on the application for the door system 10. Moreover, the vision light 102 may have a portion that extends outside of the door 11, such as past one or more of the door faces 12, 14. As such, the vision light system 100 may be customable, such as through the addition, removal, replacement, and/or adjustment of components (e.g., reinforcements, restraints, flanges thereof, trim, or the like), such as swapping out of components of the vision light system 100, as will be described herein. Consequently, the vision light system 100 may be set up as needed based on the door system 10 in which the vision light system 100 may be used and/or the requirements for the door system 10 based on the environment in which the door system 10 may be used. For example, the door system 10 may be required to resist (e.g., impede, stop, or the like) projectiles, in particular, to resist projectiles (e.g., building materials, such as studs, fasteners, metal, or the like) caused by inclement weather (e.g., storms, tornados, hurricanes, or the like) or other elements, such as from ballistics (e.g., bullets, shrapnel, or the like). In this way, a vision light 102 may be selected to satisfy the requirements of the use of the door system 10, and may be installed using the vision light system 100 with little or no modification to the components of the vision light system 100.

The vision light 102 or vision light system 100 may by any sized light, such as but not limited to 8×8, 8×10, 10×10, 10×12, 10×14, 10×16, 12×12, 16×16 inches, or any other size depending on the requirements of the end user. As such, the vision light may be square, rectangular (e.g., narrow light), or another other shape. Furthermore, the vision light may have any thickness, such as but not limited to 1, 1.5, 2, 2.5, 3, 3.5, 4, 4.5, 5, 5.5, 6 inches, or any other thickness size.

As illustrated in FIGS. 2A through 7B, the door system 10 may include a vision light system 100. The vision light system 100 may comprise a first face reinforcement member 110 (otherwise described as a first reinforcement member 110), a second face reinforcement member 120 (otherwise described as a second reinforcement member 120), and/or a light restraining member 130 operatively coupled together. Moreover, a vision light 102 may be operatively coupled between a portion of the first face reinforcement member 110 and the light restraining member 130 and/or the second face reinforcement member 120, as will be described in further detail herein. In some embodiments, the door system 10 may comprise, in a stacked configuration, a first trim 140 (e.g., a safe side trim member), a first trim reinforcement member 160, the first face 12 (e.g., first skin) of the door 11, the first face reinforcement member 110, a second face reinforcement member 120 and/or a light restraining member 130, a second face 14 (e.g., second skin), a second trim reinforcement member 170, a second trim 150 (e.g., a threat side trim member) of the door 11, and/or the like.

It should be understood that the vision light 102 may be located between at least a portion of the first face reinforcement member 110 and at least a portion of the light restraining member 130. One or more sealing members 180 may be located between at least a portion of the first face reinforcement member 110 and the vision light 102 and/or between at least a portion of the light restraining member 130 and the vision light 102. In some embodiments, the sealing member(s) 180 may comprise a sealant 182 and/or a tape 184, as illustrated in FIG. 7A. In some embodiments, the tape 184 may prevent the sealant 182 from moving past the tape 184 onto the exposed portions of the vision light 102. The sealant 182 may be rated to provide the desired resistance to the elements, and in some embodiments may be structural adhesive that provides structural support to the vision light 102. However, in other embodiments, the sealing member(s) 180 may comprise one or more of the tape 182, the sealant 184, an adhesive, an epoxy, a rubber, a putty, a caulk, and/or the like made from any type of material. The sealing member 180 may be provided in any form, such as a liquid that hardens into a solid, a solid (e.g., gasket, seal, tape, or the like), an expanding material, or the like. Regardless of the material and/or form of the one or more sealing members 180, the one or more sealing members 180 may provide a fluid seal (e.g., liquid-water, or the like, gas-air, or the like, or other like fluids depending on the situation) between separate sides of the door 11 (e.g., barrier), for example, between a threat side and a safe side of the door 11 (e.g., or other barrier, or the like). Moreover, the one or more sealing members 180 may provide structural support for the vision light 102 within the vision light system 100, such that if other securing mechanisms (e.g., one or more fasteners 190, as will be discussed herein) are removed, the one or more sealing members 180 provide the structural support needed to keep components of the vision light system 100 operatively coupled to each other.

As illustrated in FIGS. 2A through 7B, the first face reinforcement member 110, the light restraining member 130, and/or the second face reinforcement member 120 may be separate members. However, in some embodiments these components may be combined and/or may be split into addition members (e.g., less than or more than the three separate members illustrated in the figures). As illustrated in the figures, in some embodiments the first face reinforcement member 110 may be operatively coupled to the second face reinforcement member 120 and/or the light restraining member 130. The members 110, 120, 130 may be operatively coupled together through securing mechanisms (e.g., fasteners 190, or the like), by a stacked fit (e.g., sandwiched between the door faces 12, 14, or the like), through an interference fit, and/or through another type of coupling.

In some embodiments, as illustrated throughout the figures, and in particular in FIGS. 7A and 7B, the first face reinforcement member 110, the light restraining member 130, and the second face reinforcement member 120 each may have one or more flanges which may be operatively coupled together (e.g., the flanges may be mechanically coupled together, may be bent from a single piece, may be welded together, may be stamped, or the like). The first face reinforcement member 110 may comprise a first flange 111, a second flange 112, a third flange 113, a fourth flange 114, and fifth flange 115. The first flange 111 and/or fifth flange 115 may be operatively coupled to the first face 12 (e.g., first door skin of the door) and the second flange 112 and fourth flange 114, respectively. The second flange 112 and fourth flange 114 may be generally perpendicular to the first flange 111 and the fifth flange 115, and may be operatively coupled to the third flange 113. The third flange 113 may be generally perpendicular to the second flange 112 and the fourth flange 114, and thus, generally parallel to the first flange 111 and/or the fifth flange 115. The first face reinforcement member 110 extends generally into the interior of the light vision system 100 and/or the door system 10 and supports at least a portion of the vision light 102 and/or the first face 12 (e.g., directly or indirectly). The first face reinforcement member 110 may have the shape of a hat shaped member, as illustrated in the figures, or it may have another shape.

As also illustrated in FIGS. 7A and 7B, the vision light 102 may be further supported by the light restraining member 130. The light restraining member may comprise a first flange 131, a second flange 132, and/or a third flange 133. The first flange 131 may be operatively coupled to a portion of the first face reinforcement member 110, such as the third flange 113. For example, the first flange 131 may be generally parallel to the third flange 113 of the first face reinforcement member 110. The second flange 132 of the light restraining member 130 may be generally perpendicular to the first flange 131, and extend from the first flange 131 within the interior of the visions light system 100 and/or the door system 10 and extend past at least a portion of the second face 14 (e.g., second skin) of the door 11 of the door system 10 (e.g., external of the face of the door). Furthermore, a third flange 133 of the light restraining member 130 may be generally perpendicular to the second flange 132 and generally parallel to the first flange 131, and extend in the opposite direction of the first flange 131. The intersection of the second flange 132 and the third flange 133 may hold (e.g., nest around, or the like) an edge of the vision light 102, as illustrated in FIGS. 7A and 7B. In some embodiments of the invention, the light restraining member 130 may be a z-shaped member as illustrated in the figures, or it may have another shape.

In some embodiments a second face reinforcement member 120 may be further utilized to support the second face 14, a second trim reinforcement member 170, a second trim 150 (e.g., a threat side trim member), and/or the light restraining member 130. In some embodiments the second face reinforcement member 120 may comprise a first flange 121 that is secured to the third flange 113 of the first face reinforcement member 110. A second flange 122 of the second face reinforcement member 120 may extend from and be generally perpendicular to the first flange 121. Furthermore, the second face reinforcement member 120 may have a third flange 123 that may be generally perpendicular to and extending from the second flange 122 (and may be generally parallel to the first flange 121). The third flange 123 may be operatively coupled to the second face 14 of the door 11. In some embodiments of the invention, the second face reinforcement member 120 may comprise a u-shaped member as illustrated in the figures, or it may have another shape.

It should be understood that different vision lights of different thicknesses may be substituted in the vision light system 100 in order to provide customized vision light systems 100 for customized door systems 10. For example, depending on the need for the door system 10 (e.g., in order to provide a desired level of protection) to meet resistance requirements, as will be described in further detail later, different vision lights having different thicknesses may be substituted by changing components (e.g., adjusting, replacing, adding, modifying, or the like the various components). For example, in the embodiments illustrated in the figures, only the light restraining member 130 and/or the second trim 150 need to be replaced to accommodate vision lights of different thicknesses. As such, the first face reinforcement member 110 may have a first face reinforcement member width, wherein the first face reinforcement member width sets a minimum thickness of the vision light. Furthermore, the light restraining member 130 comprises a light restraining member width that sets a maximum thickness of the vision light 102 (e.g., in combination with the width of the first face reinforcement member 110). In some embodiments, in order to accommodate a vision light with a greater thickness, a light restraining member 130 having a longer second flange 132 and/or a second trim 150 having a greater width (e.g., a longer angled flange 153) may be utilized. Alternatively, in order to accommodate a vision light 102 with a smaller thickness (e.g., within the thickness of the door 11 and/or extending a shorter distance past a door skin), a light restraining member 130 having a shorter second flange 132 and/or a second trim 150 having a smaller width (e.g., a shorter angled segment 153) may be utilized. As such, customized vision light systems 100 may be created by swapping out the light restraining member 130 and/or the second trim 150 with different light restraining members 130 and/or different second trim 150 pieces. It should be further understood that in some embodiments, the light restraining member 130 and/or the second trim 150 (or the other vision light components discussed herein) may be adjustable, such as through the use of a sliding feature (e.g., which may be set with a fastener, or other securing mechanism), by bending the light restraining member 130 and/or second trim 150 at different angles to change the width of the foregoing, or other like adjustment features (e.g., tracks, slides, slots, fasteners, or the like) that allow for a single light restraining member 130 and/or a second trim 150 to be adjusted to accommodate vision lights 102 of different thicknesses.

It should be understood that while the first face reinforcement member 110, the second face reinforcement member 120, and/or the light restraining member 130 described herein may have the flanges and/or shapes as described and/or illustrated herein, the foregoing may have any number of flanges and/or shapes while performing the same for similar functions as described herein. For example, instead of having multiple members 110, 120, 130, the vision light system 100 may comprise a single reinforcement member that supports the first face 12 and/or the second face 14, and/or restrains the vision light 102. That is, the first face reinforcement member 110 may have one or more flanges that are operatively coupled to the first face 12 and one or more flanges that extend past the second face 14 and/or support the second face 14. In this way, a single reinforcement member may be utilized for different vision lights 102 having different thicknesses. In other embodiments, the vision light restraining member 130 and the second face reinforcement member 120 may be a single member that preforms both functions of the members (e.g., second face 14 reinforcement, light restraining, or the like). In this embodiment, the combined second face reinforcement member 120 and light restraining member 130 may be changed (e.g., swapped out, adjusted, or the like) to accommodate vision lights 102 having different thicknesses.

With respect to the trim 140, 150, the first trim 140 may be planer, as illustrated in the figures, or may have one more segments that may be bent at different angles to accommodate vision lights of different thicknesses. In the illustrated embodiments, the first trim 140 is planer and is operatively coupled to the first face 12 of the door 11, while the face of the vision light 102 adjacent the first face 12 is located within the thickness of the door 11. Alternatively, the second trim 150 may have multiple segments that are operatively coupled at different angles to accommodate a face of the vision light 102 that extends past a second face 14 of the door 11. For example, the second trim 150 may comprise a first segment 151 that is located adjacent and/or angled towards a face of the vision light 102 to aid in concealing components of the vision light system 100 (e.g., the restraining member 130, the one or more sealing members 180, the one or more fasteners 190, second door face 14, and/or the like). The second trim 150 may further comprise a second segment 152 that extends from the first segment 151 and is generally parallel with the face of the vision light 102. A third segment 153 may extend from the second segment 152, and depending on the thickness of the vision light 102 may be angled towards the door (e.g., second face 14) when the vision light 102 extends past the door 11 (e.g., past the second face 14), or alternatively, extends away from the door (e.g., past the second face 14) when the vision light 102 is contained within the thickness of the door 11. A fourth segment 154 may extend from the third segment 153 and may comprise a portion of the second trim 150 that is folded back upon itself (e.g., two or more layers of the second trim 150). The fourth segment 154 may be utilized to conceal one or more components of the door system 10, such as an edge of the second face 14 of the door 11 that forms the opening for the vision light system 100. As such, the fourth segment 154 may be generally parallel with the second face 14 of the door 11. The second trim 150 may further comprise a fifth segment 155 that extends from the fourth segment 154 and is generally perpendicular with the second segment 152, the fourth segment 154, and/or the second face 14 of the door 11. A sixth segment 156 may extend from the fifth segment 155 and is generally perpendicular with the sixth segment 156 and/or is generally parallel with the second segment 152, the fourth segment 154, and/or the second face 14 of the door 11. The sixth segment 156 may be operatively coupled to, such as abut, a portion of the restraining member 130 (e.g., a first flange 131 of the restraining member 130). While the second trim 150 may have the segments illustrated in the figures and described herein, it should be understood that the second trim 150 may have any number of segments that are used to conceal the components of the vision light system 100 and/or the door system 10, secure the second trim 150 to the vision light system 100 and/or the door system 10, and/or be operatively coupled to the other components of the vision light system 100, such as the first trim 140 located on the opposing face of the door system 10.

In some embodiments of the invention, one or more securing mechanisms, such as one or more fasteners 190 (e.g., bolt, screw, rivet, or the like), may operatively couple the components of the vision system 100 and/or door 11 together. In the illustrated embodiment, the one or more fasteners 190 may operatively couple, such as extend through, a first trim 140, a first trim reinforcement member 160, a first face 12, a first face reinforcement member 110 (e.g., through a flange, such as a third flange 113), a light restraining member 130 (e.g., through a flange, such as a first flange 131), a second trim reinforcement member 170, and/or a portion of the second trim 150 (e.g., a sixth segment 156 of the second trim 150). The securing mechanisms, such as the one or more fasteners 190, and/or the one or more sealing members 180, are utilized to hold the components together to secure the vision light system 100 within the door system 10. In some embodiments, the one or more securing mechanisms, such as the one or more fasteners 190, may be removable such that the trim 140, 150 and/or other components of the vision light system 100 may be removed in order to allow for replacement of components (e.g., swapping out different vision lights 102 of different thicknesses) and to reseal and/or weatherproof components of the vision light system 100. It should be further understood that the securing mechanism, such as the one or more fasteners 190, may be located on the safe side (e.g., inside side, or the like) of a door system 10 (or other like barrier system). In this way, the one or more securing mechanisms, such as the one or more fasteners 190 and/or the stacking of the reinforcement members, restraining member, or the like may provide increased resistance (e.g., from projectiles) from the threat side as opposed to resistance (e.g., from projectiles) from the safe side. That is, the one or more fasteners 190 and/or the components of the vision light system 100 may be arranged in order to provide improved resistance in one direction over the other. Furthermore, having the securing mechanism, such as the one or more fasteners 190, located on the safe side (e.g., inside side, or the like) of a door system 10 (or other like barrier system) prevents a person on the threat side from being able to remove the one or more securing mechanisms to allow access to the other components of the vision light system 100. That is, locating the securing mechanisms on the safe side of the door may increase the safety of the door system 10.

It should be understood that the vision light 102 is typically the limiting factor in the ability of a door system 10 to meet particular safety requirements, such as but not limited to the ability to withstand the elements, such as projectiles, as previously described herein. That is, the fill material of the door 11 and/or of the edges and faces of the door system 10 may be selected as needed to provide different security ratings. As such, the edges and/or faces of the door 11 (e.g., the shell, skins, or the like) may be made from steel (e.g., armor plated, or the like), other metals (included alloys thereof), plastics, composites, or the like. In some embodiments the shell, or the faces and/or edges thereof may be 24, 22, 20, 18, 16, 14, 12, 10, 8, or any other gage steel ranging between, overlapping, or falling outside of these values. Furthermore, the cavity of the door 11 may include a core that is formed from any type of fill material, such as but not limited to foam, concrete, steel, other metals (included alloys thereof), projectile resistant fabrics or plastics, or the like. The shell and/or core may provide resistance to the elements (e.g., from projectiles, or the like) as discussed herein, and thus, the materials may be selected based on the operating requirements of the door system 10. The vision light 102 may be formed from any type of material; however, in some embodiments the vision light 102 may be made from of a glass, polycarbonate, glass/polycarbonate laminated construction, acrylic, any other transparent glazing material, or any combinations thereof, any of which may meet the requirements for the opening. Unlike the fill material of the core, the vision light 102 material is typically at least partially translucent, and thus, the material of the vision light 102 is limited because it is required to provide resistance to the elements, while also allowing light to at least partially pass through the vision light 102. Moreover, as previously discussed herein the thickness of the vision light 102 is typically limited to the thickness of the door 11, thus further reducing the ability to provide the desired ratings. Consequently, in typical configurations when the vision light thickness reaches the thickness of the door 11 (or just smaller than the thickness of the door 11) the safety requirements (e.g., projectile resistance) cannot be increased by simply increasing the thickness of the vision light. That is, in order to meet higher safety requirements (e.g., projectile resistance), the vision light 102 material must be changed and/or added to the vision light 102. Alternatively, the vision light system 100 illustrated and described herein provides the ability for a higher rated door system 10 because the vision light thickness is not limited by the thickness of the door 11.

As such, the vision light system 100 and/or door system 10 may provide a UL level 1, 2, 3, 4, 5, 6, 7, 8, 9, 10, or the like rating. In particular embodiments, for storm rated vision light systems 100, the vision light system 100 may withstand at least a 151*b*. 2×4 wood stud traveling at 100 mph. However, because of the versatility of the vision light systems 100 (e.g., able to use different lights of different thicknesses), the vision light thickness may be varied to meet different tests. In other embodiments of the invention, the door system 10 with the vision light system 100 may have a material that has a 90, 120, 180, or the like minute fire rating. However, in other embodiments no fire rating is needed.

The vision light system 100 may be installed in the door 11 of the door system 10 before shipping for installation, or it may be installed (e.g., retrofitted, or the like) on site by the installer. Consequently, the customized vision light system 100 and/or the door system 10 in which it may be used, may be structured to provide various UL level protection from projectiles (e.g., from storms, firearms, explosions, testing, debris, shrapnel, and/or the like). As such, the door systems 10 described herein may provide the desired storm, forced entry, bullet resistant, or the like ratings in a customizable way. For example, the vision light system 100 and/or the door system 10 may provide storm resistance in accordance with the International Code Council (ICC) standards. Furthermore, the door systems 10 and/or the vision light systems 100 thereof may also be rated to withstand 5, 10, 15, 20, 25, 30, 40, 50, 60, or the like minutes of simulated "mob" attack, or range between, overlap, or fall outside of these levels of protection.

FIG. 8 illustrates a process 200 for selecting a vision light and installing the vision light system 100 in a barrier, such as a door 11. As illustrated by block 210 of FIG. 8, a selection of a vison light 102 for a vision light system 100 is made (e.g., by a user). The selection may be made based on the thickness of the door 11, the cost of the materials of different vision lights 102, the maximum distance the vision light 102 may extend past the door 11, the minimum thickness the vision light 102 (e.g., based on the width of the first reinforcement member 110), the desired level of projectile resistance, mob resistance, environment resistance, or the like, as previously discussed herein.

Block 220 of FIG. 8 further illustrates that a width of the light restraining member 130 and/or the width of the trim (e.g., the second trim 150) is selected based on the thickness of the vision light 102 selected. In some embodiments, different light restraining members 130 and/or second trim 150 pieces (e.g., both of which that may have pre-defined widths) may be selected and interchanged in order to meet a specific vision light thickness. However, in alternate embodiments, the width of the light restraining member 130 may be adjusted by a user through the use of an adjustment feature, as previously described herein. In some embodiments, the width of the second trim 150 may be adjusted through the use of an adjustment feature or other bent into a different shape, extended, or the like.

Block 230 of FIG. 8 further illustrates that an opening may be created in the barrier, such as the door 11. The opening may be created as the door is being manufactured, as illustrated in block 232 of FIG. 8. For example, the opening may be created as the edges and/or faces of the door 11 are being formed (e.g., through the use of cutting by shears, lasers, water cutters, stamping-cold or hot forming or pressing, or the like). Alternatively, as illustrated in block 234, for doors 11 that have already been formed without and opening (e.g., before or after being installed), an opening may be cut into an existing door 11.

As illustrated in block 240 of FIG. 8, the first reinforcement member 110 and first trim reinforcement member 160 may be installed in the opening of the first face 12 of the door 11 (e.g., with or without the vision light 102 installed). The first reinforcement member 110 and/or the first trim reinforcement member 160 be installed temporality until the other components can be installed to form the vision light system 100.

Block 250 of FIG. 8 further illustrates that the second reinforcement member 120 is operatively coupled to the second face 14 of the door 11 and/or the first reinforcement member 110. It should be understood that the second reinforcement member 120 may be installed into the opening of the door 11 after the first reinforcement member 110 and/or first trim reinforcement member 160 are operatively coupled to the door 11 within the opening of the door 11. Alternatively, the second reinforcement member 120 may be operatively coupled to the first reinforcement member 110 before the combination of the first reinforcement member 110, the second reinforcement member 120, and/or the first trim reinforcement member 160 is operatively coupled to the door 11 in the opening of the door 11.

FIG. 8 further illustrates in block 260 that the vision light 102 is then operatively coupled to the first installation member 110. It should be understood that the vision light 102 may be operatively coupled to the first installation member 110 after the first installation member 110 is installed. Alternatively, the vision light 102 may be operatively coupled to first installation member 110 before the combination of the first installation member 110 and the vision light 102 are operatively coupled to the door 11 through the opening in the door 11. In other embodiments, the vision light 102 may be operatively coupled to the light restraining member 130 before a combination of the vision light 102 and the light restraining member 130 are operatively coupled to the first installation member 110. The vision light 102 may be operatively coupled to the first installation member 110 through the use of one or more sealing members 180, as previously discussed herein.

As illustrated by block 270 of FIG. 8, the light restraining member 130 may be operatively coupled to the vision light 102 (e.g., using the one or more sealing members 180) if the light restraining member 130 has not been previously operatively coupled to the vision light 102. Additionally, the light restraining member 130 may be operatively coupled to the first trim reinforcement member 160, the first face 12, the first reinforcing member 110, the second trim 150, using a securing mechanism, such as a fastener 190, as a previously discussed herein. For example, the fastener 190 is utilized in order to operatively coupled the vision light system 100 together.

As such, FIG. 8 illustrates that the vision light system 100 may allow for operatively coupling of the vision light 102 to a door 11, in which the vision light 102 extends past the thickness of the door 11 using the use of interchangeable components and/or components that may have widths that may be adjusted, while providing the desired protection with reduced manufacturing and/or installation costs.

FIGS. 9A through 14C illustrate alternate embodiments of the invention in which a light insert 300 may be pre-assembled and installed into a portion of the vision light system 100 after the portion of the vision light system 100 is installed in a barrier during manufacturing of the barrier or within a barrier already installed in the field. Moreover, the light insert 300 may be sent as a replacement insert 300 for replacing a vison light 102 within a vision light system 100 that has been damaged (e.g., during manufacturing, installation, or operation, such as due to forced-entry, human phenomenon, natural phenomenon, or the like) or in the event that a vision light 102 with increased or decreased resistance is needed within the barrier.

FIGS. 9A through 11C illustrates a narrow vision light system 100 that utilizes a narrow light insert 300 (e.g., 2×24 inch light, or other like size), while FIGS. 12A through 14C illustrates a square light insert 300 (e.g., 14×14 inch light, or other like size). However, it should be understood that a light insert 300 having any size or orientation may be used for any type of barrier. The vision light system 100 illustrated in FIGS. 9A through 14C is similar to the vision light system 100 illustrated in FIGS. 1A through 7B; however, the vision light system 100 in FIGS. 9A through 14C has a light insert 300 that provides ease of installation and/or replacement of damaged vision lights 102, as well as the ease of upgrading or downgrading the resistance of the vision light 102 (e.g., for increased or decreased storm, forced entry, bullet resistant, or the like ratings in a customizable way), as will be described in further detail herein. For example, in FIGS. 9C through 14C, the vision light system 100 has an improved light restraining member 300 over the light restraining member 130 illustrated in FIGS. 1A through 7B. In particular, the light restraining member 300 in FIGS. 9C through 14C may be described a light insert restraining member 300.

As illustrated, the light restraining member 300 may comprise of a first restraining portion 310 and a second restraining portion 330. The first restraining portion 310 and the second restraining portion 330 may be formed as two separate shells that may be assembled around the vision light 102, as will be described in further detail herein. In other embodiments, the first restraining portion 310 and the second restraining portion may be integral with each other and the light restraining member 300 may have two or more segments that are attached to different edges of the vision light. For example, two segments (e.g., two L-shaped segments, two U-shaped segments, or the like) having the first restraining portion 310 and the second restraining portion 330 may be slid over different edges 104 of the vision light 102. In other examples, four segments (e.g., straight segments, four L-shaped segments, or the like) each having the first restraining portion 310 and the second restraining portion 330 may be slide over the four edges 104 of the vision light 102. In still other examples, a u-shaped segment and a single straight segment each having the first restraining portion 310 and the second restraining portion 330 may be slid over the edges 104 of the vision light 102.

Regardless of how the first restraining member 310 or the second restraining member 330 are formed (e.g., from separate shells and/or segments, or the like), the first restraining member 310 and/or the second restraining member 330 may be operatively coupled to the vision light 102 through the use of sealing members 180. In some embodiments the sealing members 180 may comprise of structural adhesive that is used to operatively coupled the first restraining member 310 and the second restraining member 330 to the vision light 102. For example, the structural adhesive may be located between one or more of the inner surfaces of the first restraining member 310 and the second restraining member 330 and a portion of the edges 104 and/or face surfaces (e.g., first face surface 106 and second face surface 108) of the vision light 102. The structural adhesive may be utilized not only to secure the vision light 102 within the light insert 300 during pre-assembly, but it also may provide the requested level of resistance (e.g., forced entry, storm resistance in accordance with the International Code Council (ICC) standards, or the like) when assembled into a vision light system 100 with a barrier.

As will be described in further detail below the first restraining portion 310 and/or the second restraining portion 330 may have a light restraining flange 320. The light restraining flange 320 may be formed from a portion of the first restraining portion 310 or a portion of a second restraining portion 330, portions of both, or the like. As such, the light restraining flange 320 may be formed from a first restraining flange 311 of the first restraining portion 310 and a first restraining flange 331 of the second restraining portion 330. For example, the first restraining flanges 311, 331 may butt into each other and have one or more apertures 322 for allowing one or more fasteners 190 to extend through of the first restraining flanges 311, 331. Regardless of how the light restraining flange 320 is formed, it may extend outwardly from the edges 104 of the vision light 102 after the first restraining portion 310 and/or the second restraining portion 330 are operatively coupled to the vision light 102. The light restraining flange 320 may be generally perpendicular with the surface of the edges 104 (as illustrated), may extend at an angle (e.g., in either direction), may be formed from two or more bends and/or projections, or the like. Regardless of the configuration, the light restraining flange 320 may be used to operatively couple the light inset 300 into the portion of the vision light system 100 already installed into a barrier (e.g., during manufacturing of the barrier, as a retrofit or replacement in a barrier in the field, or the like). For example, as will be described in further detail herein, when the light insert 300 is assembled into the vision light system 100, a plurality of fasteners 190 may extend through the first trim 140, the first trim reinforcement 160, the first face 12 (e.g., first skin), the first face reinforcement member 110, the light restraining flange 320 (e.g., the first restraining flange 311 of the first restraining portion 310, the first restraining flange 331 of the second restraining portion 330), the second face reinforcement member 130 (not illustrated), and/or the second trim 150.

As previously discussed, the first restraining portion 310 and the second restraining portion 330 may be operatively coupled to the vision light 102 through the sealing members 180. However, in some embodiments, it should be understood that the first restraining portion 310 and the second restraining portion 330 may be operatively coupled through the use of the first restraining flanges 311, 331 of the first restraining portion 310 and the second restraining portion 330. For example, in addition to or instead of using the sealing members 180 with the vision light, one or more securing mechanisms (e.g., restraining fasteners 390, clips, welds, adhesives, tapes, or the like) may be used to operatively couple the first restraining flanges 311, 331 together.

Returning to the figures, as illustrated in FIGS. 9C, 11C, 12C, and 14C, in some embodiments, the first restraining portion 310 and the second restraining portion 330 are formed as separate portions that are operatively coupled to the vision light 102. In some embodiments, the first restraining portion 310 may comprise of a first restraining flange 311, a second restraining flange 312, and/or a third restraining flange 313. The first restraining flange 311 may be used to operatively couple the light insert 300 into another portion of the vision light system 100. The second restraining flange 312 may extend from the first restraining flange 311 and cover at least a portion of an edge surface 104 of the vision light 102. The third restraining flange 313 may extend from the second restraining flange 312 and covers at least a portion of the first face surface 106 of the vision light 102. For example, the first restraining flange 311 may be generally parallel to the third restraining flange 313 of the first restraining portion 310, while the second restraining flange 312 of the first restraining portion 310 may be generally perpendicular to the first restraining flange 311 and the third restraining flange 313. The first restraining flange 311 and the third restraining flange 313 may extend in the opposite directions from the second restraining flange 312. The intersection of the second restraining flange 312 and the third restraining flange 313 may hold (e.g., nest around, or the like) a corner formed from the edge 104 and the first face surface 106 of the vision light 102, as illustrated in FIGS. 9C, 11C, 12C, and 14C. In some embodiments of the invention, the first restraining portion 310 may be a z-shaped member as illustrated in the figures, or it may have another shape.

In some embodiments, as illustrated in FIGS. 9C, 11C, 12C, and 14C, the second restraining portion 330 may comprise of a first restraining flange 331, a second restraining flange 332, and/or a third restraining flange 333. The first restraining flange 331 may be used to operatively couple the light insert 300 into another portion of the vision light system 100. The second restraining flange 332 may extend from the first restraining flange 331 and cover at least a portion of an edge surface 104 of the vision light 102. The third restraining flange 333 may extend from the second restraining flange 332 and cover at least a portion of the second face surface 108 of the vision light 102. For example, the first restraining flange 331 may be generally parallel to the third restraining flange 333 of the second restraining portion 330, while the second restraining flange 332 of the second restraining portion 330 may be generally perpendicular to the first restraining flange 331 and the third restraining flange 333. The first restraining flange 331 and the third restraining flange 333 may extend in the opposite directions from the second restraining flange 332. The intersection of the second restraining flange 332 and the third restraining flange 333 may hold (e.g., nest around, or the like) a corner formed from the edge 104 and the second face surface 108 of the vision light 102, as illustrated in FIGS. 9C, 11C, 12C, and 14C. In some embodiments of the invention, the second restraining portion 330 may be a z-shaped member as illustrated in the figures, or it may have another shape.

FIG. 15 illustrates a process for installing a new vision light system 100 in a barrier (e.g., a door 11) or replacing a light insert 300 in an installed vision light system 100, in accordance with some embodiments of the disclosure. Block 410 of FIG. 15 illustrates that the light insert 300 is pre-assembled, such as for a new installation or as a replacement light insert 300 for a vision light system 100 already installed in a barrier). For example, in some embodiments, the first restraining portion 310 and/or the second restraining portion 330 are operatively coupled to the vision light 102. For example, one or more sealing members 180 (e.g., structural sealant, or the like) may be used to operatively couple the first restraining portion 310 and/or the second restraining portion 330 to the vision light 102. Additionally, or alternatively, one or more restraining fasteners 390 may be used to operatively couple the first restraining flanges 311, 331 of the first restraining portion 310 and the second restraining portion 330.

Block 420 of FIG. 15 further illustrates that when the vision light system 100 is being installed into a barrier (e.g., door 11, or the like) during manufacturing or during a retrofit of a barrier that is already installed in the field, an opening is created in the barrier. For example, apertures may be formed in the first face 12 and/or the second face 14 of the barrier by cutting an opening in the faces 12, 14. Furthermore, as illustrated in block 425 of FIG. 15, the first reinforcement member(s) 110 are operatively coupled to the first face 12. As illustrated in block 430, the second reinforcement member(s) 130 is operatively coupled to the second face 14. The first reinforcement member(s) 110 and the second reinforcement member(s) 130 may be operatively coupled to the faces 12, 14 through the use of couplings (e.g., securing mechanisms, such as fasteners, a stacked fit, sealant, adhesives, tape, welds, or the like couplings).

Alternatively, when replacing a light insert 300 that is already installed in the field, such as in the event the current light insert 300 is has been damaged or the barrier requires a vision light 102 with improved resistance to impacts (e.g., forced entry, storm events, or the like), an installer may remove one or more securing mechanisms (e.g., one or more fasteners 190) from the installed vision light system 100 within a barrier. Moreover, as illustrated by block 445, the first trim 140 and/or the second trim 150 may be removed from the vision light system 100. In some embodiments, only one of the trim members (e.g., the second trim member 150) may be removed in order to be able to remove the current light insert 300. Block 450 of FIG. 15 further illustrates that the current light insert 300 is removed from the vision light system 100.

Regardless of whether the light insert 300 is being installed in a new barrier that has yet to be installed in the field, as a retrofit in an already installed barrier, or as a replacement light insert 300 for a damaged vision light 102 or barrier that requires a downgraded or an upgraded vision light 102, block 460 in FIG. 15 illustrates that the new light insert 300 is inserted into the portion of the vision light system 100 already installed in the barrier.

Block 470 of FIG. 15 illustrates that the first trim 140 and/or the second trim 150 are installed over the light insert 300. In some embodiments, the first trim 140 and/or the second trim 150 may be installed, as previously discussed herein, such as through the use of one or more couplings (e.g., sealing members 180, securing mechanisms, such as the one or more fasteners 190, or other like couplings). In some embodiments, the first trim 140 and/or the second trim 150 may use adhesive or other like coupling to hold the first trim 140 and/or the second trim 150 in place to the vision light system 100 before the securing mechanisms (e.g., fasteners 190, or the like) are installed.

FIG. 15 further illustrates in block 480 that the one or more securing mechanisms (e.g., fasteners 190) are installed to secure the light insert 300 within the vision light system 100 in the barrier. For example, the fasteners 190 may extend through the first trim 140, the first trim reinforcement 160, the first face 12 (e.g., first skin), the first face reinforcement member 110, the light restraining flange 320 (e.g., the first restraining flange 311 of the first restraining portion 310, the first restraining flange 331 of the second restraining portion 330), the second face reinforcement member 130 (not illustrated), and/or the second trim 150.

Although the embodiments illustrated and/or described herein are generally related to using the vision light system 100 within a door system 10, it should be understood that the vision light system 100 may be utilized in any barrier in the same or similar way as illustrated and/or described generally herein with respect to a door system 10. That is, whenever a “door” is described herein, it can be replaced with barrier.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as “distal,” “proximal,” “upper,” “top,” “bottom,” “lower,” “left,” “right,” “horizontal,” “vertical,” “upper,” “lower”, “parallel,” “perpendicular,” or other like terminology merely describe the configuration shown in the figures. The referenced components may be oriented in an orientation other than that shown in the drawings and the terminology, therefore, should be understood as encompassing such variations unless specified otherwise. It will be understood that when an element is referred to as “operatively coupled” to another element, the elements can be formed integrally with each other, or may be formed separately and put together. Furthermore, “operatively coupled” to can mean the element is directly coupled to the other element, or intervening elements may be present between the elements. Furthermore, “operatively coupled” may mean that the elements are detachable from each other, or that they are permanently operatively coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A light insert for a vision light system, the insert comprising:

a vision light;

a light restraining member comprising:

a first restraining portion;

a second restraining portion; and wherein the first restraining portion or the second restraining portion comprises:

a first restraining flange configured to be operatively coupled with a first face reinforcement member of a barrier;

a second restraining flange operatively coupled to the first restraining flange and extending over a portion of an edge of the vision light; and a third restraining flange operatively coupled to the second restraining flange and extending over a portion of a face of the vision light;

a light restraining flange formed at least partially from the first restraining flange;

wherein the vision light is operatively coupled between the first restraining portion and the second restraining portion;

wherein the insert is configured to be assembled before installation into the vision light system for the barrier having a first barrier face and a second barrier face.

2. The light insert of claim 1, wherein the first restraining portion and the second restraining portion are integrally operatively coupled.

3. The light insert of claim 1, wherein the first restraining portion and the second restraining portion are separate and operatively coupled to the vision light or each other though one or more couplings.

4. The light system of claim 3, wherein the one or more couplings comprise a structural sealant.

5. The light insert of claim 3, wherein the one or more couplings comprise a fastener extending through the light restraining flange.

6. The light insert of claim 1, wherein the first restraining portion and the second restraining portion both comprise:

the first restraining flange configured to be operatively coupled with the first face reinforcement member of the barrier;

the second restraining flange operatively coupled to the first restraining flange and extending over a portion of an edge of the vision light; and the third restraining flange operatively coupled to the second restraining flange and extending over a portion of a face of the vision light;

wherein the first restraining flange of the first restraining portion is operatively coupled with the first restraining flange of the second restraining portion.

7. The light insert of claim 1, wherein the first restraining portion is on a safe side of the barrier and the second restraining portion is on a threat side of the barrier.

8. The light insert of claim 1, wherein the light restraining flange is configured to be operatively coupled with a first face reinforcement member operatively coupled with the first barrier face of the barrier.

9. The light insert of claim 8, wherein the light insert is configured to be operatively coupled within a second face reinforcement member operatively coupled to the first face reinforcement member and the second barrier face of the barrier.

10. The light insert of claim 8, wherein a first face trim is configured to be operatively coupled to the first face reinforcement member, a second face trim is configured to be operatively coupled to the light restraining member, and the light insert is configured to be operatively coupled to first face reinforcement member using a plurality of fasteners that extend through the first face trim, the first face reinforcement member, the light restraining flange, and the second face trim.

11. The light insert of claim 1, wherein a portion of the vision light and a portion of the light restraining member are configured to extend past the first barrier face or the second barrier face of the barrier.

12. The light insert of claim 11, wherein the portion of the vision light extends past the second barrier face, wherein a vision light thickness is greater than a barrier thickness formed by the first barrier face and the second barrier face.

13. The light insert of claim 11, wherein the light insert is configured to be removed and replaced from the vision light system without removing the vision light system from the barrier.

14. A barrier system, the system comprising:

a first barrier face;

a second barrier face; and a vision light system operatively coupled to the first barrier face and the second barrier face, the vision light system comprising:

a first face reinforcement member operatively coupled to the first barrier face;

a light insert, the light insert comprising:

a light restraining member having a first restraining portion, a second restraining portion, and a light restraining flange, wherein the first restraining portion or the second restraining portion comprises:

a first restraining flange operatively coupled with the first face reinforcement member of a barrier, wherein the first restraining flange forms at least a portion of the light restraining flange;

a second restraining flange operatively coupled to the first restraining flange and extending over a portion of an edge of the vision light; and a third restraining flange operatively coupled to the second restraining flange and extending over a portion of a first face of the vision light; and a vision light operatively coupled between the first restraining portion and the second retraining portion;

wherein the light insert is configured to be assembled before installation into the vision light system.

15. The barrier system of claim 14, wherein the first restraining portion and the second restraining portion are separate and operatively coupled to the vision light or each other though one or more couplings.

16. The barrier system of claim 14, wherein the first restraining portion and the second restraining portion both comprise:

the first restraining flange operatively coupled with the first face reinforcement member of the barrier;

the second restraining flange operatively coupled to the first restraining flange and extending over a portion of an edge of the vision light; and the third restraining flange operatively coupled to the second restraining flange and extending over a portion of a second face of the vision light wherein the first restraining flange of the first restraining portion is operatively coupled with the first restraining flange of the second restraining portion.

17. The barrier system of claim 14, wherein the vision light system further comprises:

a first face trim:

a second face trim; and a plurality of fasteners;

wherein the first face trim is operatively coupled to the first face reinforcement member, the second face trim is operatively coupled to the light restraining member, and the light insert is operatively coupled to first face reinforcement member using a plurality of fasteners that extend through the first face trim, the first face reinforcement member, the a light restraining flange, and the second face trim.

18. A method for installing a light insert into a portion of a vision light system in a barrier, wherein the barrier comprises a first barrier face operatively coupled to a second barrier face, and wherein the vision light system comprises:

a first face reinforcement member operatively coupled to the first barrier face; and a light insert, the light insert comprising:

a light restraining member having a first restraining portion, a second restraining portion, and a light restraining flange, wherein the first restraining portion or the second restraining portion comprises:

a first restraining flange configured to be operatively coupled with the first face reinforcement member of the barrier, wherein the first restraining flange forms at least a portion of the light restraining flange;

a second restraining flange operatively coupled to the first restraining flange and extending over a portion of an edge of the vision light; and a third restraining flange operatively coupled to the second restraining flange and extending over a portion of a face of the vision light; and a vision light operatively coupled between the first restraining portion and the second retraining portion;

wherein the method comprises:

installing the light insert into the portion of the vision light system operatively coupled to the barrier; and installing a plurality of fasteners for operatively coupling the light insert to the vision light system, wherein the plurality of fasteners extend through the first barrier face, the first face reinforcement member, and the light restraining flange.

* * * * *